March 13, 1934.  P. R. GLASS  1,950,550
CASE MAKING MACHINE
Filed July 21, 1931   11 Sheets-Sheet 1

INVENTOR.
Perley R. Glass
By his Attorney,
Harlow M. Davis

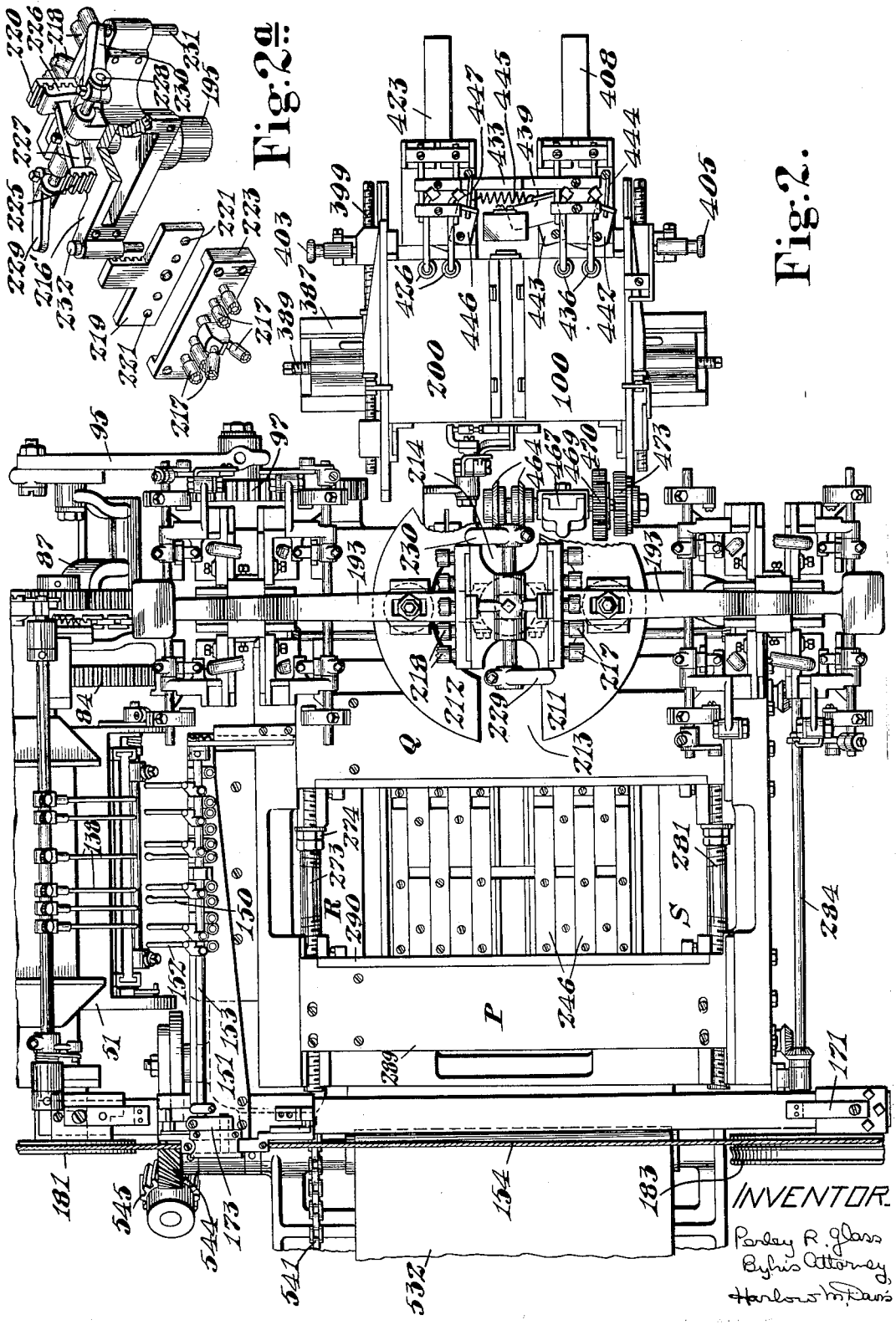

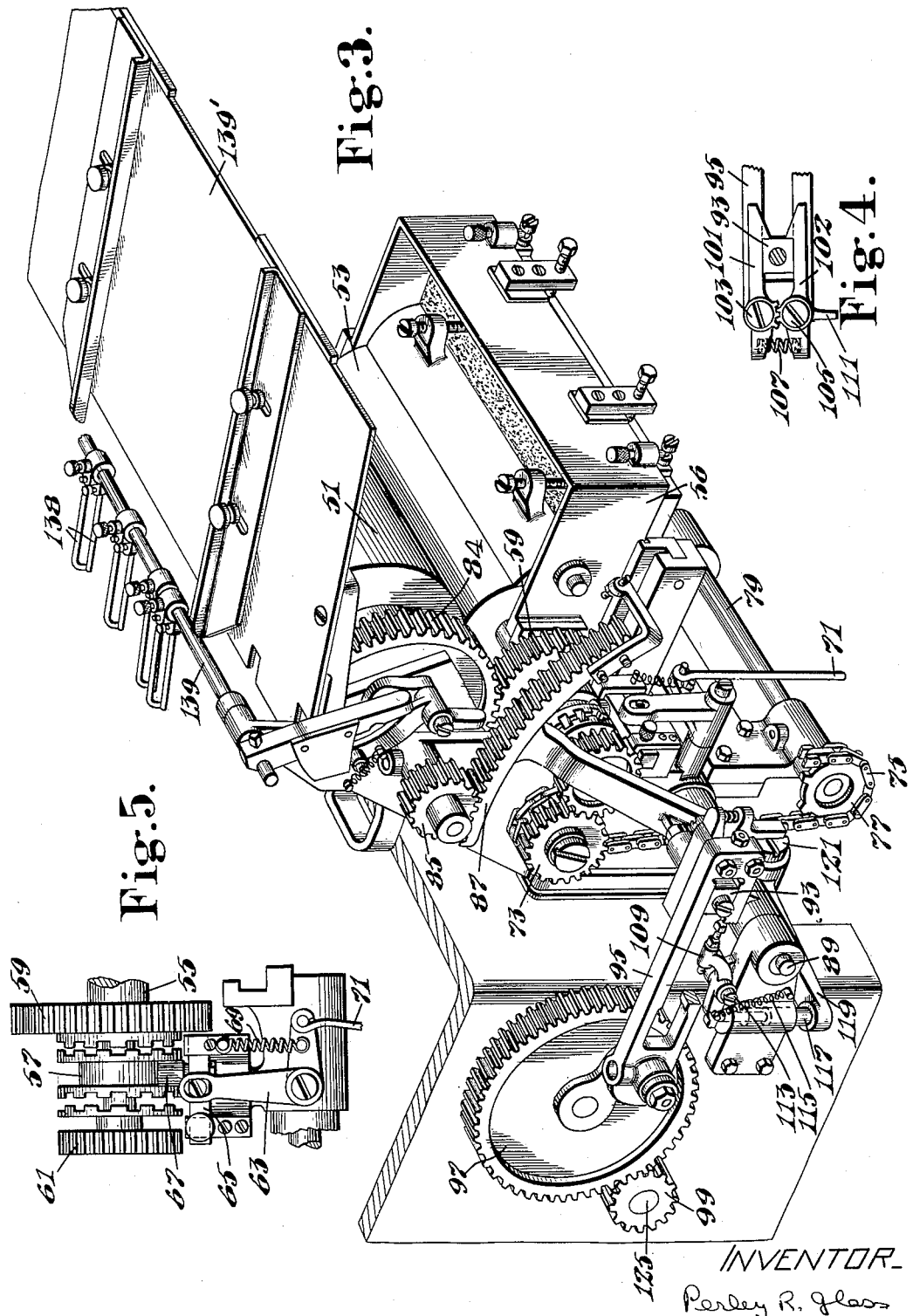

March 13, 1934.   P. R. GLASS   1,950,550
CASE MAKING MACHINE
Filed July 21, 1931   11 Sheets-Sheet 6

INVENTOR
Perley R. Glass
By his Attorney
Harlow M. Davis

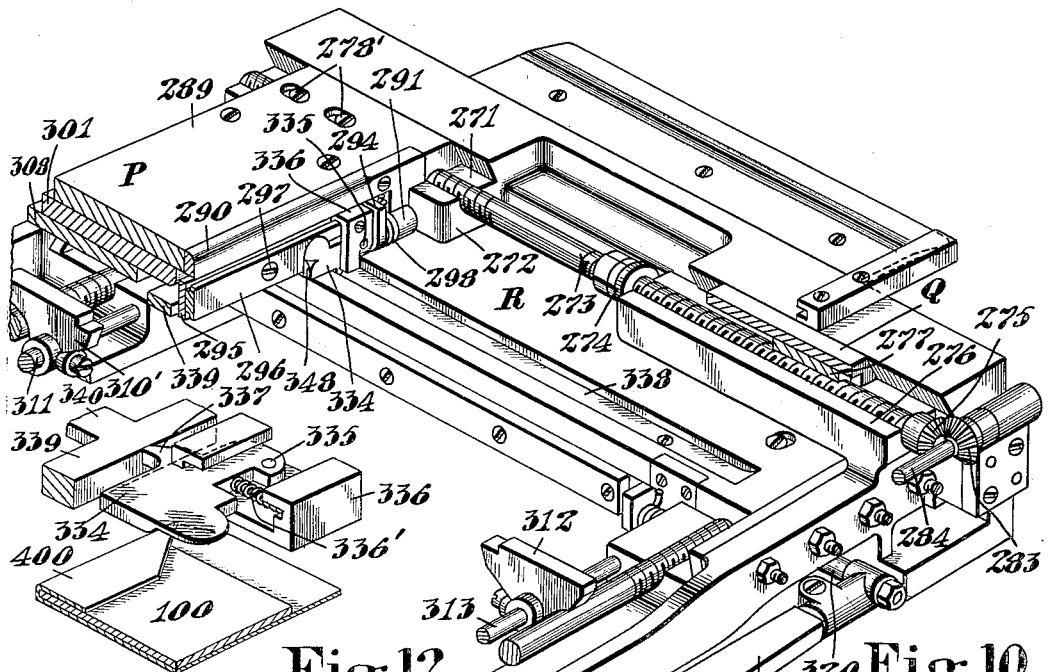
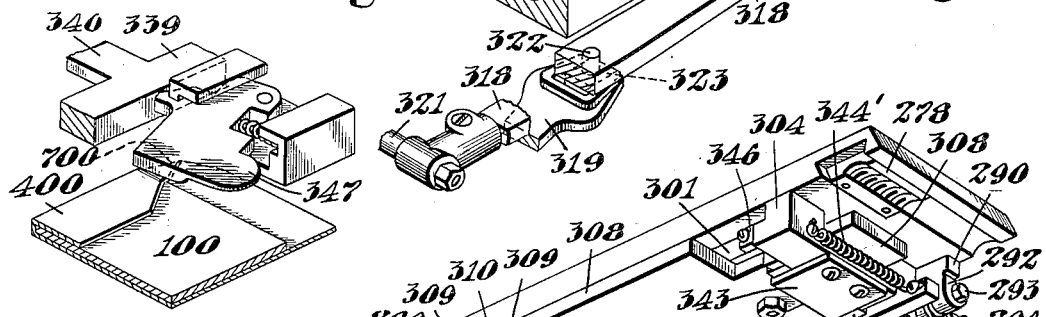
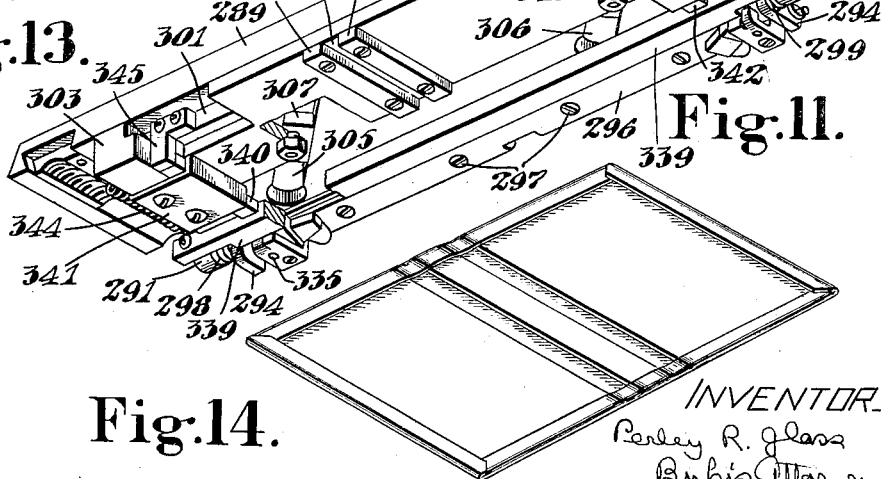

March 13, 1934. P. R. GLASS 1,950,550
CASE MAKING MACHINE
Filed July 21, 1931 11 Sheets-Sheet 8
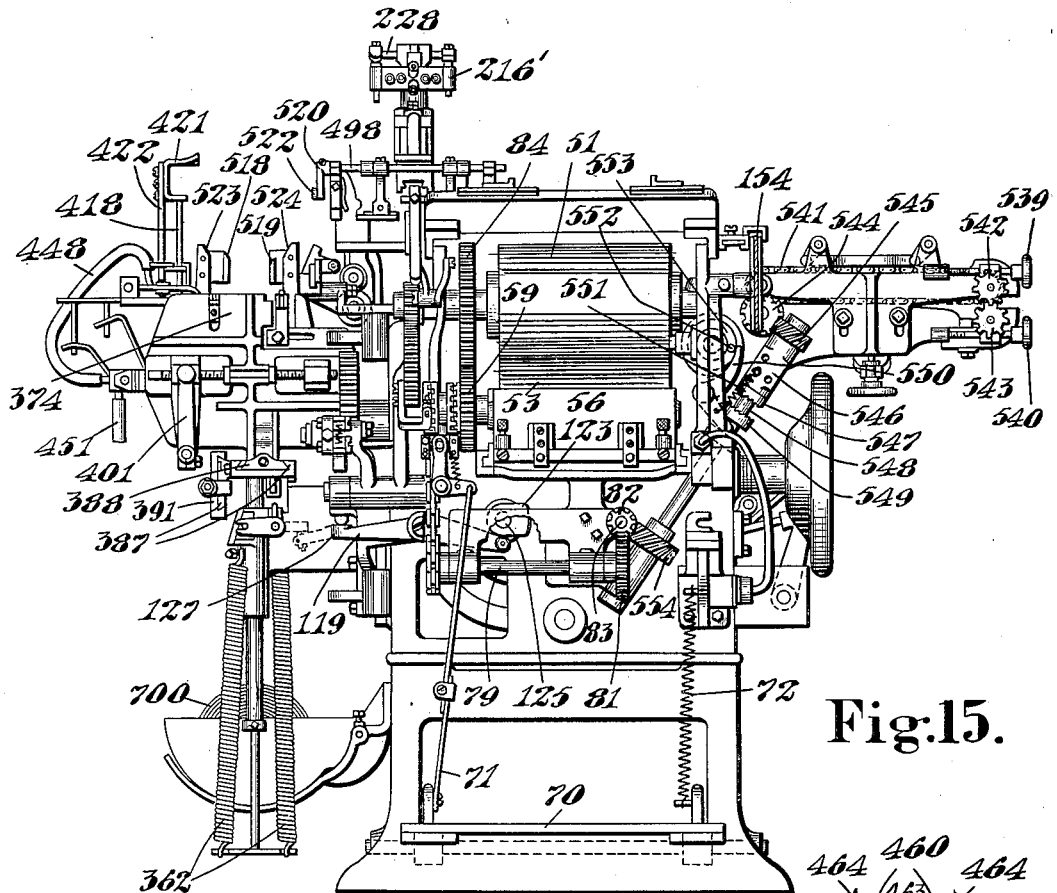
Fig. 15.
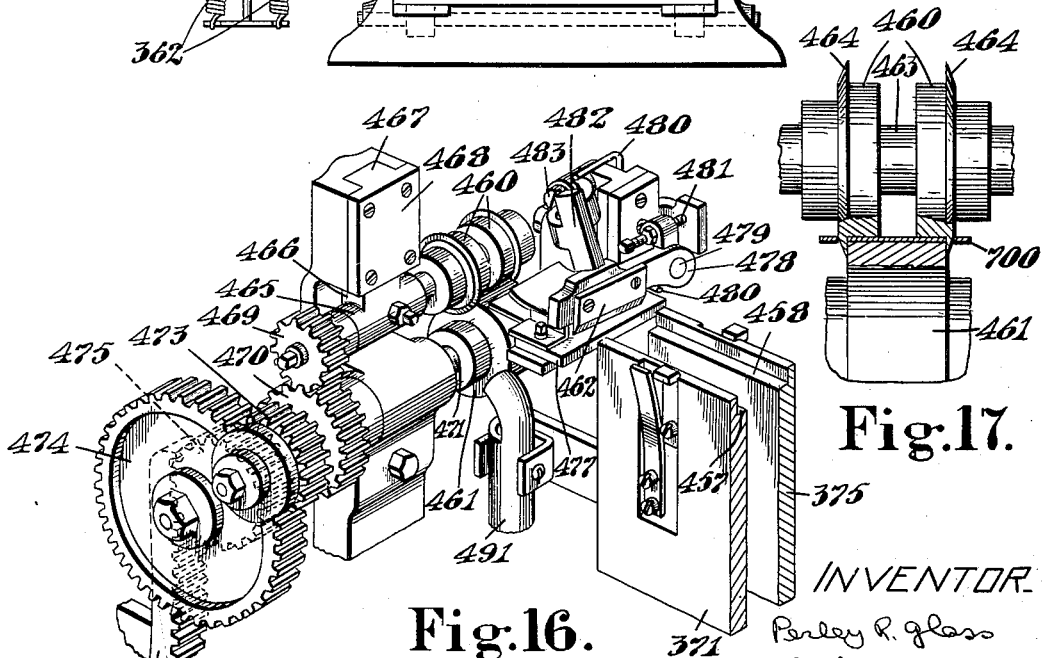
Fig. 16.
Fig. 17.
INVENTOR
Perley R. Glass
By his Attorney
Harlow M. Davis

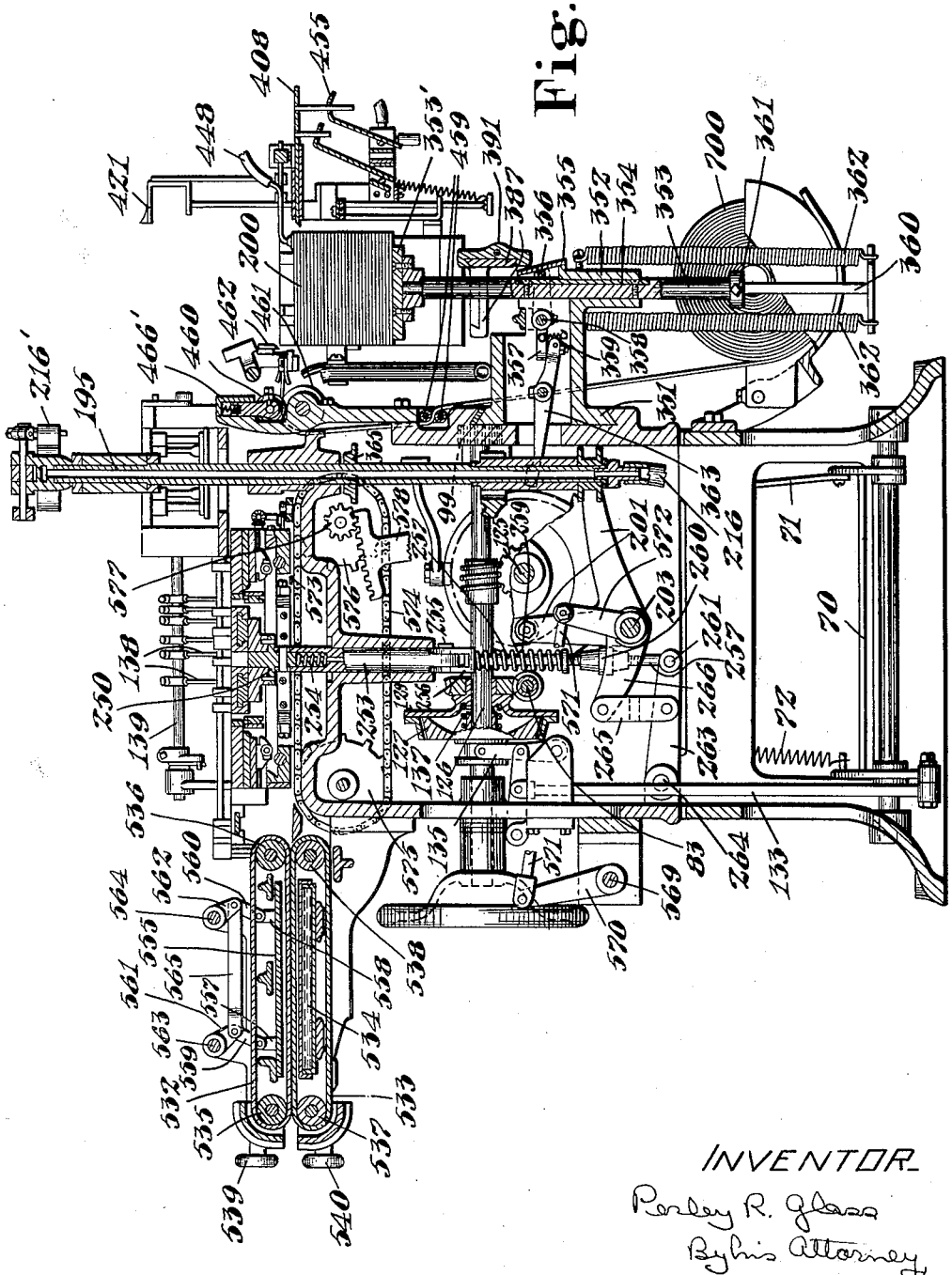

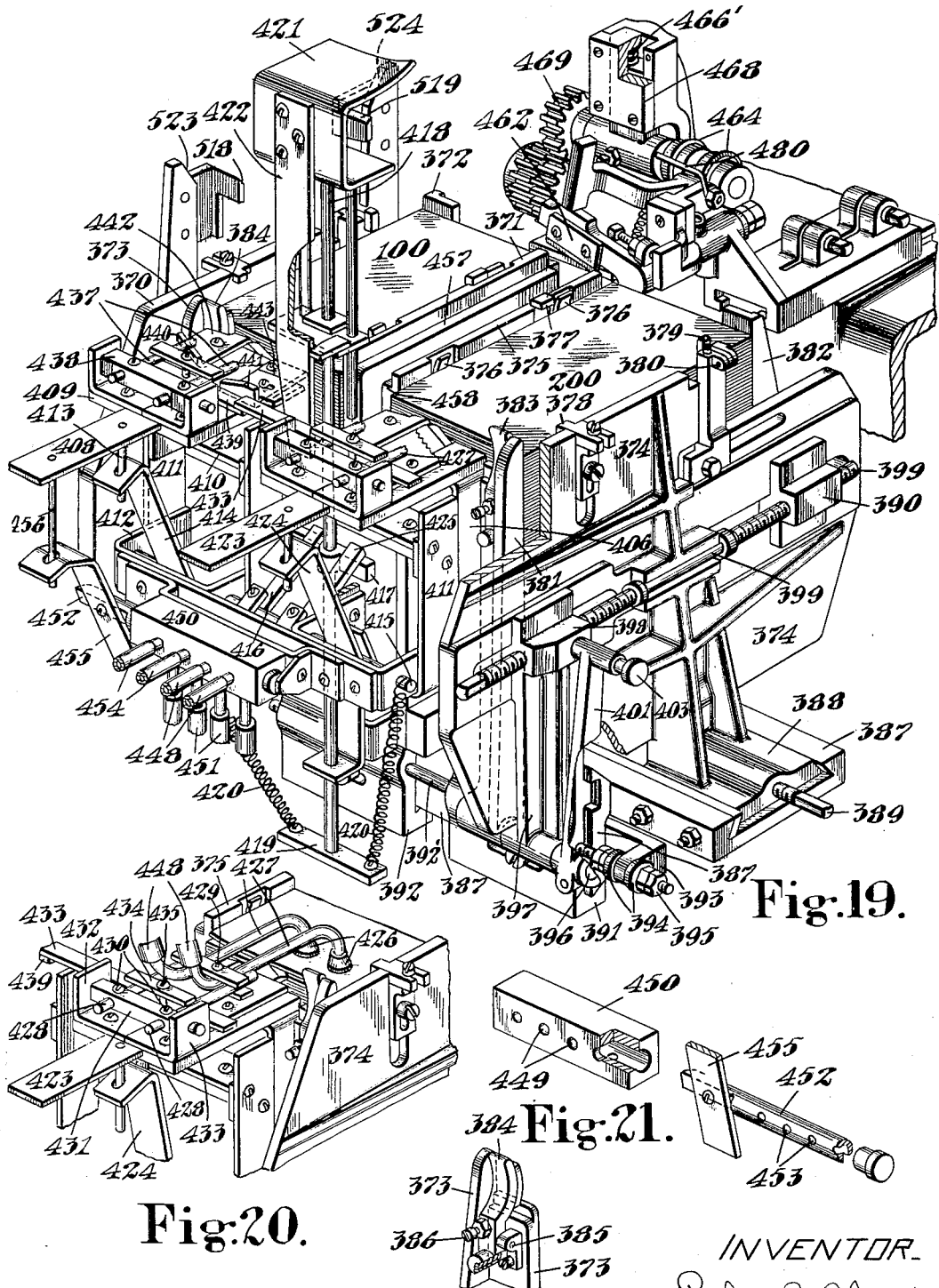

March 13, 1934.  P. R. GLASS  1,950,550
CASE MAKING MACHINE
Filed July 21, 1931   11 Sheets-Sheet 11
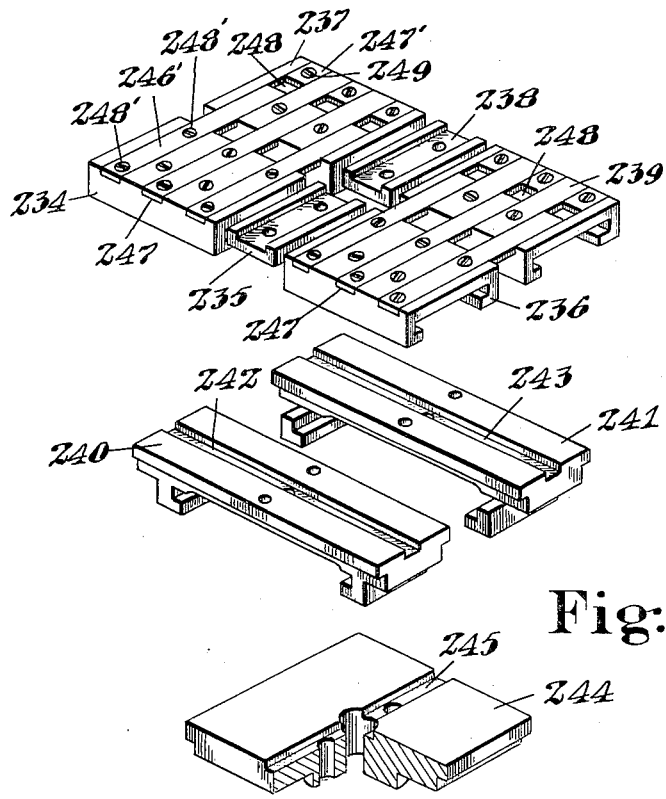
Fig:23.
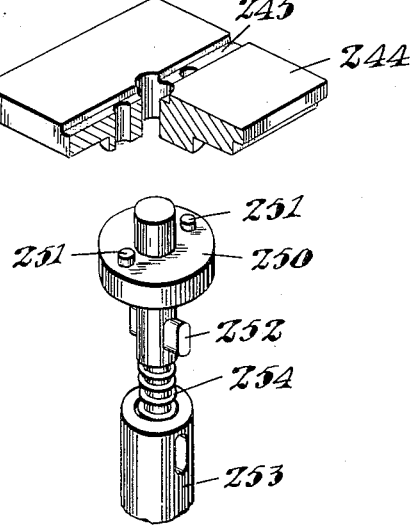
INVENTOR
Perley R. Glass
By his Attorney
Harboush Davis Patented Mar. 13, 1934

1,950,550

UNITED STATES PATENT OFFICE 1,950,550

CASE-MAKING MACHINE

Perley R. Glass, Salem, Mass., assignor to United Shoe Machinery Corporation, Paterson, N. J., a corporation of New Jersey Application July 21, 1931, Serial No. 552,196

74 Claims. (Cl. 154—41)

This invention relates to machines for making cases for books and is herein illustrated as embodied in a machine which is particularly adapted to the manufacture of flexible cases.

One type of machine which is commonly used in the manufacture of book cases comprises folding mechanism, mechanism for coating one side of a cover with adhesive and for transferring the cover to the folding mechanism, a supply of boards, and a picker-head which picks up two boards, places them in position on the coated cover, and cooperates with the folding mechanism in folding the margin of the cover about the edges of the boards. The output of machines of this general type has hitherto been limited by the fact that only one picker-head has been employed with the result that the minimum time required for the production of each case has been the interval required for one complete cycle of movements of the picker-head.

In order to speed up the output of case-making machines of this general type, in accordance with one feature of the invention, a plurality of picker-heads are employed which are so operated that while one picker-head is at the folding station another is at the board supply station. In the illustrated machine two picker-heads are provided mounted at opposite ends of a cross-arm which is carried by a rotary and vertically reciprocable shaft to which intermittent half rotations preceded by upward movements and followed by downward movements are imparted, a folding station and a board supply station being located respectively at diametrically opposite points beneath the common path of revolution of the picker-heads. Assuming that a half-revolution has just been imparted to the illustrated picker-heads to locate one picker-head with boards above the folding station and the other picker-head without boards above the board supply station, the two picker-heads move down, the one to place its boards upon an adhesively coated cover and thereafter to cooperate with the folding mechanism, and the other to descend upon the tops of the two stacks of boards at the board supply and engage two boards. The two picker-heads then rise and receive another half-revolution to cause the first-named picker-head, which now carries no boards, to move into a position above the board supply station, and the second-named picker-head, which now carries two boards, to move into position above the folding station to which another adhesively coated cover has meantime been delivered. With this construction the output of the machine may be substantially doubled since two cases are completed for each half-revolution of the picker-head shaft.

In machines of this general type the adhesive substance, commonly glue, is applied to the cover by the upper portion of a roll the lower portion of which is immersed in the glue in a receptacle, said roll being rotated intermittently as covers are presented to the machine. When the machine comes to rest, the glue roll also comes to rest; and if the machine remains at rest for any considerable interval, the coating of glue upon the upper, exposed part of the roll hardens and has to be scraped off before the machine will operate properly again. In accordance with another feature of the invention means are provided for rotating this roll continuously while the machine is at rest so as to avoid the formation of this hard coat of adhesive substance. In the illustrated machine the glue roll is rotated continuously from a rotating shaft while the machine is at rest and no cases are being made, but is disconnected from this driving shaft and rotated intermittently from another shaft when the treadle is depressed to start the machine.

As has been stated the illustrated machine is particularly well adapted to the manufacture of flexible cases the boards of which are thin and somewhat flimsy and tend to adhere to one another when superposed in a stack. It is desirable, therefore, to provide means for facilitating the picking up by the picker-head of only one board at a time from the top of a stack. To this end and in accordance with another feature of the invention, one end of the topmost board of a stack is lifted up and a separator blade is thrust beneath it just before the picker-head descends upon the stack. In the illustrated construction a lifter engages the top board by suction and is swung up by the forwardly moving separator blade, the mechanism being so timed that the end of the board is lifted just before the forward end of the blade moves beneath it.

These and other features of the invention, including certain details of construction and combinations of parts, will be described as embodied in an illustrated machine and pointed out in the appended claims.

Referring to the accompanying drawings,

Fig. 2 is a plan of the machine;

Figure 6:
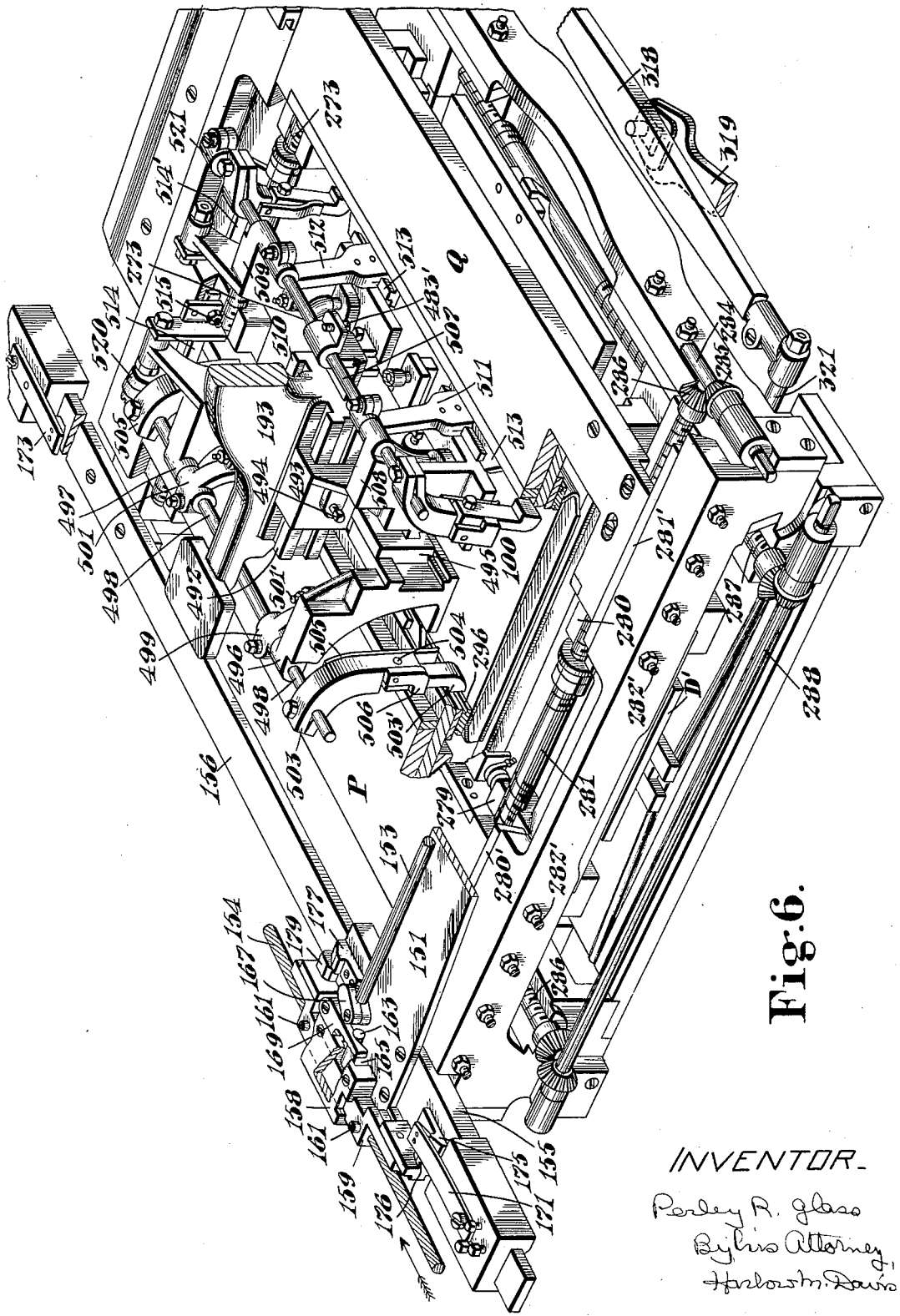
Figure 7:
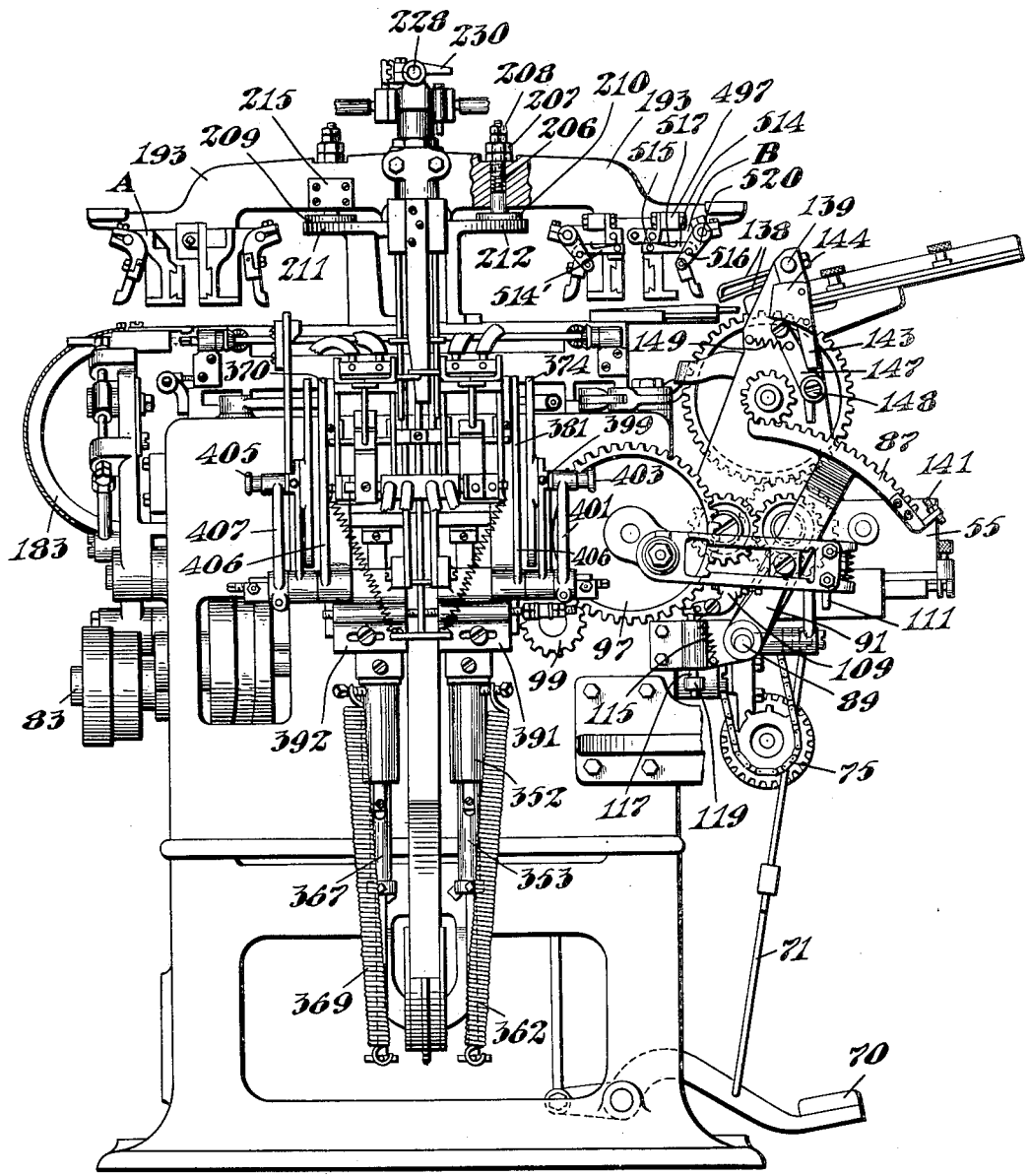
Figure 8:
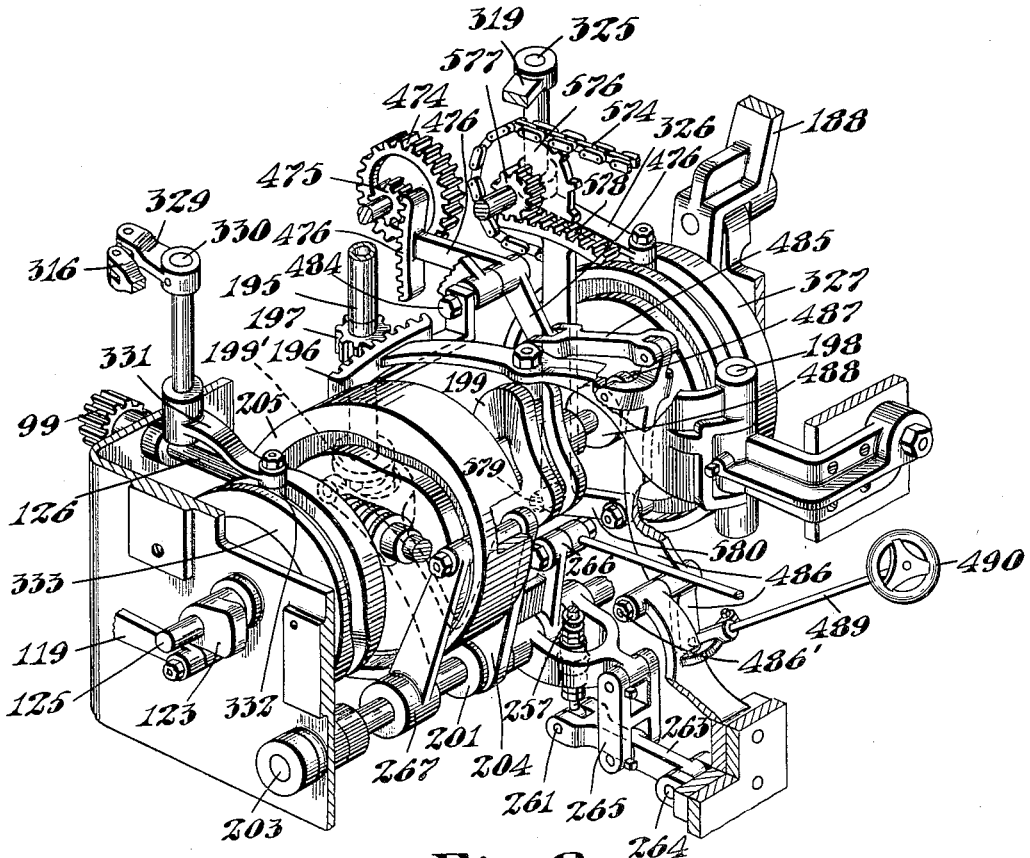
Figure 9:
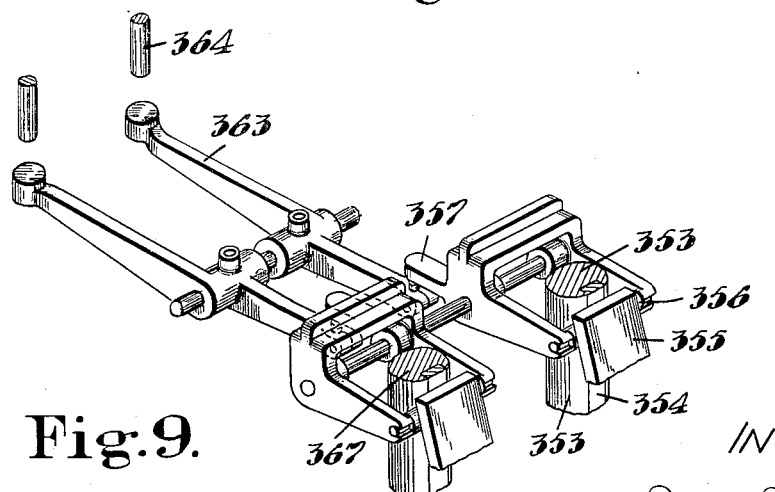

Fig. 2ª is a perspective showing in separated relation the parts of the mechanism for controlling the application of suction to the picker-heads;

Fig. 3 is a perspective of the mechanism for applying adhesive to the covers;

Fig. 4 is a detail of part of the connecting rod 95 through which the drum 51 and glue roll 53 are driven, showing its connection with the sliding block 93;

Fig. 5 is an elevation of the clutch mechanism for rotating the glue roll continuously when the machine is otherwise at rest;

Fig. 6 is a perspective of a portion of the machine showing principally the construction of one of the picker-heads and its manner of cooperating with the folding mechanism, there being in the machine a book case, the end margins of the cover of which have just been folded over the boards;

Fig. 7 is a side elevation of the machine;

Fig. 8 is a perspective of the cam shaft and cams by which motion is imparted to various work-engaging members of the machine;

Fig. 9 is a perspective of part of the mechanism for maintaining the tops of the stacks of boards at a predetermined level;

Fig. 10 is a perspective of part of the folding mechanism;

Fig. 11 is a perspective, viewed from the under side of one of the folding assemblies;

Fig. 12 is a perspective of one of the tuckers shown in its horizontal position in which it is about to be swung forward to tuck one of the corners of a case;

Fig. 13 is a perspective of a tucker which has been moved forward;

Fig. 14 is a perspective of a finished book case;

Fig. 15 is a front elevation of the machine;

Fig. 16 is a perspective of the mechanism for feeding, trimming and cutting off a backing strip;

Fig. 17 is a detail of the trimming mechanism;

Fig. 18 is a vertical transverse section of the machine taken through the picker-head shaft;

Fig. 19 is a perspective of the magazines for the boards and of the mechanism for lifting the ends of the topmost boards and thrusting the separator blades beneath them;

Fig. 20 is a detail of one pair of suction lifters and its separator blade;

Fig. 21 is a perspective of the valve which controls the application of suction to the suction lifters;

Fig. 22 is a perspective of the upper end of one of the end bars of one of the magazines; and Fig. 23 is a perspective of the sectional platen and its support, the parts being shown in separated relation.

Figure 1:
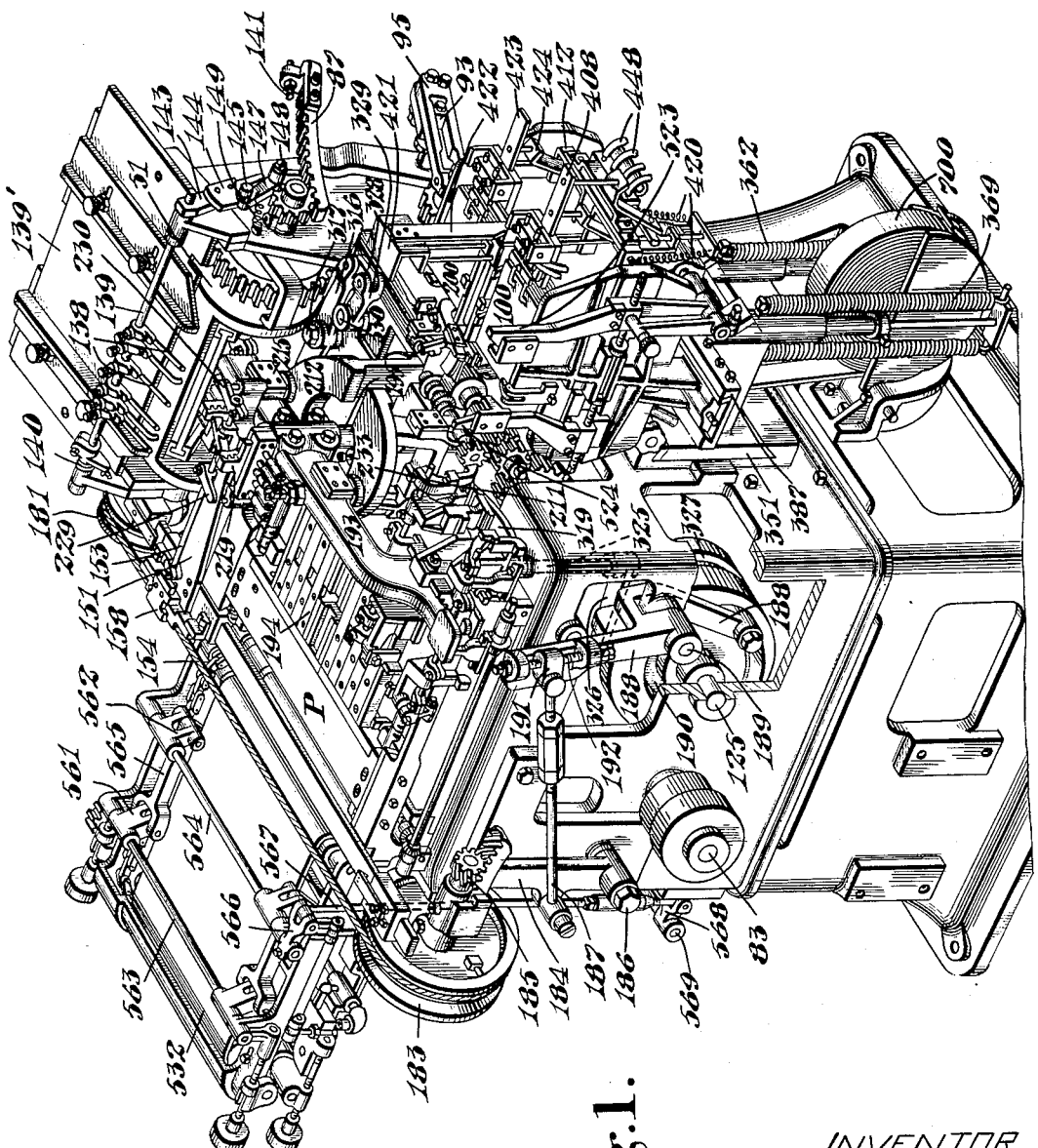
Fig. 1 is a perspective of a machine in which the present invention is embodied, a part of the picker-head carrying arm and the picker-head carried by that part having been omitted.

Before proceeding to a detailed description of the machine a brief description of its mode of operation will be given. Referring principally to Fig. 1, a cover of cloth, leather or other flexible sheet material is presented to a drum 51 by an operator or by suitable feed mechanism. This drum makes a complete revolution during which it carries the cover over a glue roll 53 (Fig. 3) directly beneath it to coat one side of the cover with glue. A transferrer slide 151 having suitable grippers, transfers the coated cover, with the coated side uppermost, to the platen or support 194 at the folding station. Meanwhile, one of the picker-heads, the one shown in Fig. 1, has picked up two boards from the tops of the stacks of boards 100, 200 and swings into position over the cover. The picker-head moves down to place the boards on the cover. The picker-head and the platen then move down together to what will be referred to as the upper folding level. During this downward movement, the end margins of the cover are bent up by the vertical faces of normally upright pivoted folders which are then swung down to fold the end margins of the cover over the ends of the boards. The picker-head and the platen then carry the partly folded case down to a lower level where the side margins of the cover are folded by similar pivoted folders. The picker-head now rises to free the case which is then fed between two belts, the upper one of which is shown at 532. The case is first pressed between adjacent runs of these belts, and is then ejected from the machine.

*Mechanism for applying adhesive to the covers*

As has been stated above, the cover is presented with its forward end on the mutilated drum 51 to which complete revolutions are imparted intermittently to cause glue or other adhesive material to be applied to the covers by a glue roll 53, the glued covers being taken from the drum at the completion of each revolution thereof and transferred in a manner presently to be described in detail to the platen at the folding station. Suitable clamping means, not shown, are provided to hold the cover on the drum 51 while the cover is being coated with glue and to release the cover preparatory to its transfer. Clamping means of this kind are old, an example of such means being shown, for example, in Patent No. 580,111, granted April 6, 1897, upon an application filed in the name of Arthur I. Jacobs. As will presently appear, the glue roll 53 is also rotated intermittently. It is desirable, however, when the machine is at rest, that the glue roll be rotated continuously so as to prevent the formation of a hard coating of glue upon its exposed upper surface, and to this end suitable mechanism is provided. The shaft 55 of the glue roll (Fig. 5) has slidably keyed upon it a clutch collar 57 having two sets of teeth, one of which may be caused to engage complementary teeth on the hub of a large gear 59 and the other of which may be caused to engage teeth on the hub of a smaller gear 61 both of which are loose upon the shaft 55. The gear 61 is continuously rotated; and the gear 59 is intermittently rotated. A bell crank lever 63 has a loose connection with a slide 65 having a roll 67 which extends into a circular groove in the hub of the clutch collar 57. A spring 69 attached at one end to the horizontal arm of the bell crank lever and at its other end to the frame of the machine normally holds the clutch collar 57 in engagement with the teeth on the hub of the gear 61; and a treadle rod 71 provides means for moving the clutch collar into engagement with the teeth on the hub of the gear 59. The treadle rod at its lower end is attached to a treadle 70 (Fig. 15) depression of which starts the machine. Consequently, when the treadle is in its normal raised position in which it is held by a heavy spring 72 and the machine is not running, the glue roll 53 is rotating continuously in the glue receptacle 56. When the treadle is depressed to start the operation of the machine, the clutch collar 57 is disengaged from the gear 61 and is engaged with the gear 59. The glue roll and the drum are consequently rotated intermittently when the machine is running, but when it is at rest the drum 51 is stationary and the lower or glue roll 53 is rotating continuously. The gear 61 is driven continuously (Fig. 3) by a gear 73 on a short shaft and a chain 75 which runs around a sprocket integral with the gear 73 and around another sprocket 77 at the outer end of a horizontal shaft 79. This latter shaft (Fig. 15) has at its inner end a gear 81 meshing with a small gear 82 on the driving shaft 83 of the machine.

Referring again to Fig. 3 the mechanism for rotating the drum 51 and the glue roll 53 will be described. The gear 59 on the shaft of the glue roll 53 meshes with a gear 84 on the shaft of the drum 51 the outer end of which has fast to it a small gear 85 engaged by a segmental rack 87 having a hub at the lower end of its stem which is rotatable on a shaft 89. The gear 84 is not fast to the shaft of the drum 51 but is connected to it by a one-way clutch, not shown, of any suitable construction so that, when this gear is rocked in a counterclockwise direction, as viewed in Fig. 3, a complete rotation is imparted to the drum, but when this gear is rocked in a clockwise direction the drum 51 remains stationary. Integral with the hub of the rack 87 (Fig. 7) is an arm 91 having pivoted to its upper end a square block 93, best shown in Fig. 3, slidable in a straight track in a connecting rod 95, the inner end of said rod being journaled on a pin projecting from the face of a gear wheel 97. The gear 97 meshes with a small gear 99 fast to a counter-shaft 125 which is driven continuously when power is applied to the machine. During the interval which elapses from the time a cover is presented to the drum 51 until it has been folded and delivered from the folding mechanism, the gear 97 makes two revolutions. It is desirable, however, that only one of these revolutions should be effective, since the other one occurs after the cover has been taken away from the drum 51 to be operated upon further. To this end the block 93 is clamped to the connecting rod 95 during the first revolution of the gear 97, during which the cover is glued, and is freed from the connecting rod during the second revolution so that the segmental rack is not then oscillated. The block 93 (Fig. 4) is normally held in one end of the track in the connecting rod 95 by cooperating catches 101, 102 geared together and pivoted respectively to the connecting rod at 103 and 105. A compression spring 107 normally holds them in engagement with the block, as shown in said figure. As thus far described the block would be held immovable with respect to the connecting rod 95, and each complete reciprocation of the connecting rod 95 would impart a complete oscillation to the segmental rack 87. Provision is made, however, for moving the catches to inoperative position at the proper times to free the block so that, during one of the two revolutions of the gear 97, the block 93 remains stationary, and the connecting rod slides upon it. This mechanism comprises a trip 109 which is moved into and out of the path of a finger 111 integral with the catch 102. This trip is pivoted at 113 to the frame of the machine and is urged at all times to move into the path of the finger 111 by a spring 115. In order to move it out of said path, the tail of the trip is engaged by the upper end of a pin 117 which is moved up at the proper times by the outer end of an arm 119 on which the pin rests, said arm being pivoted at 121 and having its inner end (Fig. 15) depressed at the proper time and held depressed by a cam 123 on the cam shaft 125 of the machine. This cam shaft (Fig. 18) is driven from the clutch shaft 126 by means of a worm and gear as shown. The clutch shaft has fast to it the internal member 127 of a friction clutch and has loose upon it the external member 129, said external member being rigid with a worm wheel 131, said worm meshing with a small gear on the driving shaft 83. Depression of the treadle 70 through a treadle rod 133 breaks a toggle and swings to the left a yoke 135 which engages a circular groove in the hub of the internal member 127 and permits a compression spring 137 to aid in throwing in the clutch.

Returning now to Fig. 3, and assuming that the connecting rod 95 occupies its extreme left-hand position and that two revolutions of the gear 97 occur, the operation is as follows:

During the first half of the first revolution the connecting rod moves to the extreme right and the segmental rack 87 is swung to the right. During the second half of the first revolution, when the connecting rod is moving to the left, the trip 109 is swung up into the path of the finger 111 so that the catches 101, 102 are opened to release the block 93. The block, however, still moves to the left since it is in contact with the right-hand end of the track in the connecting rod. During the first half of the second revolution the trip is still operative so that the block 93 remains stationary during this movement to the right of the connecting rod, and the segmental rack 87 also remains stationary. During the second half of the second revolution the trip is moved out of the path of the finger 111 so that, just at the end of this second movement of the connecting rod to the left, the catches engage the block once more.

To recapitulate, the operator places the forward end of the cover on the drum 51 and depresses the treadle 70. This throws in the clutch and causes the clutch collar 57 (Fig. 5) to engage the gear 59. As the gear 97 makes two revolutions, the first revolution rotates the drum 51 to apply glue to a cover, but the second revolution is ineffective. The operator proceeds to feed successive covers to the machine until he wishes to stop the operation of the machine entirely, at which time he releases the treadle 70, whereupon the machine comes to rest with the exception of the glue roll 53 which is then rotated continuously.

The usual gage fingers 138 (Figs. 1 and 2), some of which have downturned ends, are provided to facilitate presentation of a cover to the drum 51. These fingers are adjustably fastened to a rock-shaft 139 mounted in suitable bearings in the frame of the machine. A coiled spring 140 on the farther end of the rock-shaft 139, as viewed in Fig. 1, normally holds the fingers in raised, inoperative position. They are lowered for short intervals, to permit the forward edge of a cover to be properly presented over the table 139' to the drum 51, by an adjustable abutment screw 141 carried by the segmental rack 87. To this end, the rear end of the rock-shaft 139 has a depending arm 143 having fixed to it a cam 144 adapted to be engaged by a roll 145 on a lever 147 pivoted at 148 to the frame of the machine and normally held in the position shown by a spring 149, said lever having a tail in the path of the abutment screw 141. As the segmental rack 87 rotates the drum 51 into position to receive a cover, the abutment screw 141 strikes the tail of the lever 147 and moves the gage fingers 138 down into operative position. Shortly after the rack 87 reverses its direction of movement, these gage fingers are again released.

*The mechanism for transferring the glue-coated covers to the platen at the folding station*

Referring more particularly to Figs. 1 and 2, the glue-coated cover is taken from the drum 51 of the gluing mechanism by a series of pairs of grippers and transferred to the platen of the folding mechanism. The lower members 150 (Fig. 2) of the grippers are rigid with a transferrer bar 151, and the upper members 152 are fast to a rock-shaft 153 carried by said bar. This bar is first moved forward into the position shown in Fig. 2 by a cable 154 to cause the grippers to engage a glue cover and is then moved back by the same cable to which a forward and back motion is imparted in a manner presently to be described. The bar 151 (Fig. 6) is fixed to a slide 155 which runs on a guide 156 and has fast to it a block 158. Slidable transversely on one end of the bar 151 and through a guideway in the block 158 is a small slide 159 which is fastened by set screws 161 to the cable 154. The sliding movement of the small slide 159 is of small extent and is limited by a pin 163 carried by the small slide 159 and extending through a horizontal slot 165 in the block 158. The slight relative movement of the slide 159 and the block 158 is made use of to rock the shaft 153 and thereby to raise and lower the upper members 152 of the grippers so as to open and close the grippers. This shaft 153, which carries the upper members and the pairs of grippers, is mounted for rocking movement in bearings which are rigid with the bar 151, said shaft being normally held in position to hold the grippers open by a small compression spring, not shown, which rests upon the bar 151 and pushes up one end of a small block 167 fixed to the rock-shaft. In order to rock this shaft at proper times to close the grippers, a finger 169, fixed at one end to the rock-shaft, has on its underside an inclined cam face, on and off from which the pin 163 may travel. This travel, produced by the relative movement of the block 158 and the small slide 159, closes the grippers and permits them to open at the proper times. In the position of parts shown in Figs. 6, the cable 154 has just moved a short distance to the right in the direction indicated by the arrow and there come to rest, and the pin 163 has moved from the left-hand to the right-hand end of the slot 165; and, in doing so, has run off from the inclined face on the underside of the finger 169 so as to permit the gripper fingers on the shaft 153 to be swung up so that the grippers are open, and a glued cover has been delivered upon the platen of the folding mechanism. The cable 154 presently moves again to the right to carry the bar 151 with the grippers a little past the position shown in Fig. 2 to receive another glue-coated cover from the drum 51. During all this movement, the pin 163 remains in the right-hand end of the slot 165 and the grippers remain open. When the cable 154 moves to the left, the first effect is to move the pin 163 to the left-hand end of the slot and beneath the inclined cam surface on the underside of the finger 169 to close the grippers, which remain closed until opened again in the manner described to deliver the cover upon the platen of the folding mechanism. Thus, at the reversal of direction of movement of the cable at each end of its stroke, the small slide 159 moves relatively to the bar 151 and to the block 158 to open or close the grippers. In order to make sure that the bar 151 and the block 158 do not then move, spring hooks 171, 173 are provided; and inasmuch as they operate in substantially the same manner, the operation of only one of them will be described. The hook 171 engages a catch 175 fixed to the slide 155, which carries the bar 151 and block 158, at the end of the left-hand movement of the slide, when the cable 154 pulls the small slide 159 to the right, the slide 155 and the parts mounted upon it are held stationary while the pin 163 moves to the right-hand end of the slot 165. In order to release the hook after this has been accomplished, an abutment 176 adjustably fastened to the small slide 159 engages the underside of the hook and raises it. A catch 177 and an abutment 179 similar respectively to the catch 175 and the abutment 176 cooperate with the other hook 173 at the other end of the guide 156.

The cable 154 is carried by two pulleys (Fig. 1), a single groove pulley 181, and a double groove pulley 183, the ends of the cable being fastened to the pulley 183 so that, when this pulley is rotated first in one direction and then in the other, the upper run of the cable 154 moves forward and back carrying with it the slide 155 and the parts mounted thereon. The pulley 183 is rotated back and forth at the proper times by means of a segmental spiral rack 184, which meshes with a small spiral gear 185 on the shaft of the pulley. The hub of the rack is pivoted at 186 to the frame of the machine and is rocked through a connecting rod 187 by a lever 188 pivoted to the frame at 189 and having a depending portion provided with a roll which runs in a closed cam-track 190 in a cam on the cam shaft 125. The connecting rod 187 is pivoted at its outer end to the segmental rack 184 and at its inner end to a small block 191 having a vertical bore to receive a screw 192 mounted for rotation in spaced lugs on the lever 188 but held from longitudinal movement. By turning this screw, the throw of the connecting rod may be varied. The cam-track 190 is so formed that the following movements are imparted to the upper run of the cable 154 with the following results. Assuming that the parts are in the position shown in Figs. 1 and 2 and that the upper run of the cable 154 is moving to the left as viewed in Fig. 1, the grippers on the rock-shaft 153 being closed upon the margin of a glue-coated cover, the movement to the left continues until the hook 171 (Fig. 6) engages the catch 175. The cable 154 then moves slightly to the right into the position shown in that figure. During this movement, the pin 163 moves from beneath the inclined cam surface on the lower face of the finger 169; and the small spring, not shown, swings the block 167 to rock the shaft 153 and open the grippers to permit the glue-coated cover to be delivered on the platen at the folding station. This is the position shown in this figure. The cable 154 remains stationary while the cover is being folded over the margin of the boards in a manner presently to be described. The cable 154 thereafter moves to the right until the hook 173 engages the catch 177. Subsequent movement to the left causes the grippers to engage a glue-coated cover and then to carry it to the left until the hook 171 once more engages the catch 175. A short movement to the right again occurs, whereupon the parts are once more in the position shown in Fig. 6.

*Mechanism for moving the picker-heads and controlling the suction*

As has been stated, there are two picker-heads which operate to transfer the boards, two at a time, from the stacks to the platen and to cooperate with the platen and the folders in folding the margins of the glue-coated covers over the margins of the boards. These two picker-heads, indicated as a whole respectively at A and B (Fig. 7), are mounted at opposite ends of a heavy arm 193. In the operation of the machine (Fig. 1) each picker-head successively lifts two boards at a time from the stacks of boards 100, 200, carries them into a position above the platen 194 upon which a glue-coated cover has been deposited in the manner described above, and places them in proper position on the cover. The platen is mounted for vertical movement in an opening in the machine frame and is first moved down to a certain level where the margins at the ends of the cover are folded over on the boards. It is then moved to a lower level where the margins at the sides of the cover are similarly folded. The picker-head follows the platen down and cooperates with the folding mechanisms at the two levels. It then rises, swings around into a position above the stacks of boards 100, 200 and repeats its operation. In the present machine, as has been stated, there are two picker-heads so that, when one picker-head is engaging two boards to remove them from the stacks, the other picker-head is at the folding station. The picker-heads are thus given half-revolutions intermittently and are also moved up and down. The heavy arm 193, referred to above, which carries the picker-heads is fast to the upper end of a hollow shaft 195 (Fig. 2ª) which is so mounted in suitable bearings that it may rotate as well as slide vertically. As shown in Figs. 1 and 2, the shaft occupies its highest position in which there is being imparted to it a half-revolution by a segmental rack 196 (Fig. 8) which meshes with a pinion 197 on the shaft. The pinion and the rack are in mesh only when the shaft is at its highest position, and the rack always moves the shaft in one direction. The rack is mounted at the outer end of an arm pivoted at 198 to the frame of the machine and carrying near its middle a roll which runs in a track in a cam 199 on the cam shaft 125, so that the rack swings in a substantially horizontal path. The lower end of the picker shaft 195 has fast to it a grooved collar 199' to receive two oppositely disposed rolls carried by the arms of a fork formed at the outer end of a lever 201 the hub of which is loose on a rock-shaft 203. A second lever 204, the hub of which is fast to the hub of the lever 201, has at its upper end a roll which runs in a suitable track in the cam 205. This track is so shaped that, when the picker-heads A and B arrive respectively above the platen of the folding mechanism and above the stacks of boards, the vertical picker-head shaft 195 is moved down by steps until the cover has been folded over the margins of the boards beneath the picker-head A, at which time the picker-head B is in contact with the stacks of boards in the magazines. Thereafter the picker-head shaft is raised, and the rack 196 imparts to it a half-revolution so that the picker-head B is then above the platen, and the picker-head A is above the stacks of boards, whereupon the picker-head shaft is again moved down by steps.

In order to steady the rotative movements of the heavy arm 193 which carries the picker-heads, as well as to prevent said arm from overthrowing, there are mounted in the arm (Figs. 1, 2 and 7) the stems of two friction disks 209, 210 which press upon the flat tops of segmental supporting members 211, 212. Since the mountings of these disks are substantially the same, only one of them will be described. The disk 210 is pressed down at all times by compression spring 206 the tension of which may be varied by screwing down a threaded sleeve through which the stem of the disk passes, said sleeve having a hexagonal head 207. At the upper end of the stem are small nuts 208 which limit the extent of downward movement of the disk. In order to permit the arm to move down when it reaches a position in which the picker-heads are respectively above the platen and above the stacks of boards, as well as to guide the arm in its vertical movement, guideways 213, 214 (Fig. 2) are provided which are respectively opposite to the folding platen and to the stacks of boards; and the arm 193 is thickened at two localities by the addition of two small plates 215 (Fig. 7) so that these two thickened portions have sliding fits in the guideways.

As is usual, suction is employed to cause the boards to be held against the lower flat surface of the main portions of the picker-heads. The picker-head shaft is hollow and its interior is connected with the mechanism for creating a partial vacuum, said mechanism including a hose 216 (Fig. 18) connected at one end to the shaft, by a coupling which permits rotation of the shaft, and at its other end to any suitable suction device. Fastened to the top of the picker-head shaft (Fig. 2ª) is a casting 216' containing an air chamber from opposite sides of which extend two series of flexible tubes 217, 218 which lead to suitable ports respectively in the two picker-heads, said ports terminating in suction cups on the undersides of the picker-heads. The application of suction through the tubes 217 is controlled by a valve 219 and that through the tubes 218 is controlled by a valve 220, said valves each having in them a series of ports (those in the valve 219 being indicated at 221) which may be caused to register with the tubes 217 or 218 as may be desired. To this end the outer wall 223 on one side of the air chamber is offset as shown to provide a guideway to receive the valve 219 for vertical sliding movement; and the similar valve 220 is similarly mounted. The upwardly extending stem of each valve is provided with a rack, and these racks are engaged respectively by segmental racks 225, 226 formed at opposite ends of an arm fast to a rock-shaft 228 rotatively mounted in bearings carried by the air chamber 216'. At one end of the shaft is fastened a finger 229 and at the other end a finger 230. Passing loosely through a vertical bore in a lug on the air chamber is a headed pin 231 located beneath the outer end of the finger 230; and a similar pin 232 is mounted beneath the outer end of the finger 229, so that, by pushing up the pins alternately, suction may be simultaneously applied to one picker-head and cut off from the other. The pushing up of these pins alternately is caused by the lowering of the picker-heads when one of them is at the folding station and the other above the stacks of boards. As the picker-heads complete the last portion of the downward movement, the lower end of one of the pins 231, 232 strikes an abutment 233 (Fig. 1) carried by the member 211 and rocks the shaft 228 thereby closing one valve, for example the valve 219, and opening the other valve, 220.

The construction is such that suction is applied to that picker-head which is about to pick up two boards from the stacks and is cut off from that picker-head which is about to rise from a completely folded cover. In Fig. 1 the parts of the valve mechanism are in the same position as they are in Fig. 2ᵃ. The picker-head at that end of the heavy arm 193 which is nearest to the observer is in a position in which it is carrying two boards to the platen 194 at the folding station, the boards being held against the under face of the picker-head by reason of the fact that the valve 219 is open. The other valve, 220, is closed and no suction is being applied through the other picker-head. Presently, the arm 193 will complete its half-revolution at which time one picker-head will be above the platen 194 and the other above the stacks of boards. The arm with the picker-heads will then move down by steps as described above. Just before the completion of the downward movement, the finger 230 will be pushed up to shut off the suction from the picker-head at the folding station and to apply suction to the picker-head which is then in engagement with two boards.

*The platen and the folding mechanism*

The platen (Fig. 23) on which the covers are placed and on which the folding is done comprises six sections, 234, 235, 236, 237, 238, 239, slidably mounted on a sectional support comprising two sections, 240, 241. The sections 234, 235, 236 are slidably mounted on the supporting section 240 by means of undercut guideways and are held in position by screws which pass through small holes in the sections of the platen and abut with their lower ends the bottom of a groove 242 in the supporting section 240. This groove is provided to receive the ends of the set screws so that the top of the supporting section will not become roughened by action of the screws upon it as would otherwise occur if the groove were not provided. The other three sections of the platen 237, 238, 239 are slidably mounted upon the supporting section 241 and similarly held in adjusted position by set screws which pass through the sections of the platen and abut against the bottom of a groove 243. The middle sections 235, 238 of the platen, as will presently appear, receive the usual backing strip which is placed by a picker-head upon the glue-coated cover at the same time that the two boards are placed upon it. The supporting sections 240, 241 have undercut guideways to receive ribs on a base 244 and are held in adjusted position by set screws which pass through holes in said supporting sections and abut against the bottom of a groove 245 in the base. It is desirable that the supporting face of the platen should be as smooth and unbroken as possible, particularly along its margin, so that it may properly support the margin of the boards during the folding operation and the subsequent pressing of the folds. To this end the sections 234, 236 of the platen are provided with grooves 247 which register respectively with grooves 248 in the other two corresponding sections; and these grooves are completely filled, when the two sets of three sections each are brought together, by small bars and blocks. These bars are shown at 246' and the blocks at 247'. The bars 246' are held in place by screws 248' and the blocks are held in place by screws 249. It will thus be seen that the margin of the platen remains substantially continuous, however it may be adjusted, except for the grooves in the two middle sections 235, 238 and two small gaps at its opposite ends. The bars 246' bridge the gap between the two sets of sections in several places so that the cover and the boards are properly supported. With the construction which has been described above the dimensions of the platen may be increased in four directions to provide for covers of different sizes. It will be noted that the middle sections 235, 238 are respectively provided with grooves which register, and that these grooves have no filler pieces. The purpose of these grooves is to provide a passageway for a portion of the ejector, to be described later, which engages the completely folded case and transfers it to the pressing mechanism, also to be described later.

The base 244 rests on a disk 250 and has holes in its underside to receive positioning pins 251. The stem of the disk has a horizontal key 252 extending through vertical guide slots in the walls of the hollow upper portion of a rod 253; and a shoulder on the stem rests upon a spiral composition spring 254. The lower end of the rod 253 (Fig. 18) is pivoted at 255 to the arms of a fork 256. Extending loosely through the base of the fork is a headed rod 257 having threaded upon it a collar between the upper face of which and the under side of the fork is a compression spring 259 the tension of which may be varied by turning the collar. The rod is in two sections connected by a turn-buckle 260 so that its length may be varied. The lower end of the rod is pivoted at 261 to the outer end of an arm 263 the inner end of which is pivoted at 264 to the frame of the machine. This arm is connected by a link 265 to the stem of a yoke 266 (best shown in Fig. 8). The forks of the yoke 266 are fast to the rock-shaft 203 to which is also fast the hub of an arm 267, the upper end of which carries a roll extending into a track in the cam 205. This track is so shaped that the following movements are imparted to the platen. Assuming that the platen is in its uppermost position, as shown in Fig. 2, and that a picker-head has placed two boards and a backing strip upon a cover, the platen moves down with the picker-head to the first level. During this movement the small spring 254 (Fig. 18) takes care of the variations in thickness of the boards. At this first level the end margins of the cover are folded over the boards and then the platen is pushed up slightly through the heavy spring 259 to press the folds. The platen next moves down with the picker-head to the second level where the side margins of the cover are folded and the folds pressed. The platen then moves down slightly to release the folded case which is thereafter delivered to a pressing mechanism, presently to be described, and is finally ejected from the machine. The platen rises with the picker-head into its uppermost position, whereupon the picker-head rises farther and is given a half-revolution, as has been described above.

The rectangular platen is received in a rectangular opening defined by four folding assemblies arranged in sets of two. These four assemblies are indicated respectively as a whole by P, Q, R, S in Fig. 2, the assemblies P and Q extending along the two opposite ends of the opening and the two assemblies R and S extending along the two opposite sides of the opening at a level below that of the assemblies P and Q. The assembly P (Fig. 10) has one end resting upon the upper flat surface 271 of a lug 272 on the frame. A half-round threaded groove extends through this lug and receives an adjusting screw 273 which has, respectively, at its ends right- and left-hand threads and is held from longitudinal movement by a collar 274 and a hub of a bevel gear 275, both fast to the stem of the screw and engaging opposite ends of a second lug 276 which also has a half-round threaded groove in its upper surface to receive the other end of the screw 273. The folding assembly Q has one end resting upon the upper flat surface of the lug 276 and carries a hardened block 277 having a threaded half-round groove to receive the upper portion of one end of the screw 273. The assembly P has a similar block 278, so that turning the screw 273 one way or the other tends to separate or to draw together the ends of the assemblies P and Q, as shown. The hardened block 278 is adjustably held in place by screws 278' which pass through slots in a part of the assembly P; and the hardened block 277 is held in place in a similar manner. The other ends of the assemblies P and Q, as shown in Fig. 6, rest in a similar manner respectively upon lugs 279 and 280 and are adjustably connected by a right and left screw 281 similar to the screw 273. The bevel gear 275 (Fig. 10) at one end of the screw 273 meshes with a bevel gear 283 on one end of a small shaft 284. At its other end the shaft 284 (Fig. 6) carries a bevel gear 285 which meshes with a bevel gear 286 on the adjusting screw 281. By turning the small shaft 284 the assemblies P and Q may be adjusted toward and from each other. It is believed to be unnecessary to describe in detail the mountings of the two lower assemblies R and S since their mountings are practically the same as those of the assemblies P and Q. Referring to Fig. 6, the adjusting screws for these lower assemblies are shown at 286' and 287, and the shaft by which these screws may be turned is shown at 288. It is thus possible by turning the two shafts 284 and 288 to increase or decrease the size of the rectangular opening bounded by the four folding assemblies. Referring still to Fig. 6, it will be seen that the ends of the two assemblies nearest to the observer rest respectively against gibs 280', 281' which are held in place by screws 282' so that, when these two gibs have been removed, the folding assemblies may be lifted out of the machine.

The four folding assemblies P, Q, R and S are substantially alike except for certain small differences which will be noted, and consequently only one of them will be described in detail. Referring to Figs. 10 to 13, the folding assembly P comprises a supporting bar 289 from the under side of which all the other parts are hung so that the whole assembly may readily be removed and replaced if desired in the manner described above. Fast to the forward edge of the supporting bar 289 is a small bar 290 having at its ends depending cylindrical bosses 291, 292 to receive alined screws, one of which is shown at 293, said screws having conical ends which enter fast to the opposite ends of a swinging folder carfast to the opposite ends of a swing folder carrier bar 295 to which a folder bar 296 is rigidly fastened by screws 297. The purpose of thus making the swinging folder in two parts is to permit the folder bar 296 to be removed and replaced by one of different length when desired. For example, it may be desired to fold the sides and ends of the cover without folding the corners so that the case thus partly finished may, after the operation of the present machine, be taken to another machine which is adapted to produce round instead of square corners. Coiled springs 298, 299 fastened at one of their ends respectively to the blocks 294 on the folder carrier bar 295 and bearing with their other ends against the small bar 290 normally hold the folder in vertical position, as shown in Fig. 10.

When a cover is placed upon the platen, its margins extend beyond the sides of the opening bounded by the folding assemblies P, Q, R, S so that, when the picker-head deposits two boards and a backing strip on the cover and moves down, the margins are bent up in front of the folders, one margin being bent up in front of the folder bar 296. The folder must then be swung down about the common axis of the pivot screws (one of which has been pointed out at 293) to fold the upstanding margin of the cover down upon the board. To this end a folder actuating bar 301 is moved forward at predetermined times to swing the folder bar 296 into the horizontal position shown in Fig. 11. This actuating bar rests at its ends on flanges formed on blocks 303, 304 fastened by screws to the under side of the supporting bar 289 so that it may slide crosswise of said bar. It has diagonal slots 305, 306 into which extend square blocks, one of which is shown at 307, pivotally carried on the upper side of a second bar 308, said second bar being slidable lengthwise of the supporting bar 289 in guideways formed in the blocks 303, 304. Thus lengthwise reciprocation of the second bar 308 will cause crosswise reciprocation of the folder actuating bar 301, first to swing the folder bar 296 down into horizontal position and then to permit the coiled springs 298, 299 to return it to its normal vertical position. In order to reciprocate this second bar 308 at the proper times it has fast to its under side two small ribs 309 which form between them a channel 310. Into this channel extends the upper portion of an actuating block 310' which is reciprocated lengthwise of the folding assembly P at proper times. This block is adjustably fastened to a small rod 311 which is mounted for lengthwise horizontal sliding movement. The corresponding block which is associated with the folding assembly Q is indicated at 312 and is adjustably mounted on a horizontal sliding rod 313. The farther ends of these two sliding rods are fast to a bar (not shown but like the bar 318 of Fig. 10) which extends at right angles to them; and this bar has a pin at its middle, like the pin 322 provided with a pivotal block like the block 323 engaged by a fork like the fork 319 which is oscillated at the proper times to reciprocate the two small rods 311, 313 so as to cause the folding bars to fold the ends of the covers over the boards. A part of the stem of the fork which reciprocates these two rods 311, 313 is shown in Fig. 1 at 316, said stem being pivoted to the frame at 317. This bar and this fork, as has been stated, are substantially the same as the corresponding bar 318 and fork 319 which are shown in Fig. 10 and which serve to reciprocate the two sliding rods 320, 321 of the two lower folding assemblies R and S. The bar 318 is fast at one end to the rod 320 and at the other end to the rod 321. At its middle a pin 322 carries rotatably at its lower end a square block 323 which is engaged by the fork 319. The hub of the stem of this fork is fast to a vertical rock-shaft 325 (Figs. 1 and 8) mounted in suitable bearings in the frame; and this shaft is rocked by an arm 326 which is fast at one end to the shaft and has at its other end a roll extending into a cam-track in a cam 327 on the cam shaft 125. When, therefore, the vertical shaft 325 is rocked, the yoke 319 is oscillated in a horizontal path to operate the folders of the folding assemblies R and S. Returning now to the mechanism for operating the folders of the assemblies P and Q (Fig. 1) the bar (not shown) which connects the ends of the small sliding rods 311, 313, as has been stated, is like the bar 318 and has a pivoted block like the block 323. The part of the stem of the yoke 316 which engages this block is not, however, fast to an upright rock-shaft. Instead, the stem of the yoke is pivoted to the frame at 317, as has been stated, and the rear end of the stem is connected by a small link 328 to the outer end of a short arm 329 (see also Fig. 8) the hub of which is fast to the upper end of a small upright rock-shaft 330 which corresponds to the other small rock-shaft 325. The upright shaft 330 has its lower end fast to one end of an arm 331, the other end of which carries a roll 332 extending into a cam-track in a cam 333 on the cam shaft. Thus, the rotation of the cams 333 and 327 reciprocates the sliding bar 303 (Fig. 10) of the folding assembly P and the other three similar bars of the other folding assemblies Q, R and S to swing the folder bars down at the proper times.

It has been stated above that the four folding assemblies are substantially alike. The two assemblies P and Q, however, at the upper level are provided with so-called "tuckers" to facilitate the smooth formation of the square corners of the folded case. Referring to Figs. 12 and 13, there is shown a board 100 after an end margin of a cover 400 has been folded over. The end of the folded-over margin has no part of the board beneath it and extends over an adjacent side margin of the cover which is presently to be folded to complete the folding of the corner. There are two thicknesses of cover at this locality, and these two thicknesses are liable to cause the completely folded cover to be somewhat bunchy at this locality. In order to avoid this undesirable result a tucker is provided for acting upon the end of the folded-over margin of the cover to press it firmly down upon the unfolded margin directly beneath it to produce the result shown in Fig. 13. In the present machine there are four of these tuckers one at each end of the folding assembly P and one at each end of the corresponding folding assembly Q. Inasmuch as these four tuckers are substantially alike only one of them will be described in detail. Referring to Figs. 10, 12 and 13, the tucker 334 is pivoted at 335 to a small bracket 336 adjustably fastened by a set screw to the folder bar 296, a tension spring 336' being provided to hold the tucker normally in the position shown in Fig. 10. The tucker has an abutment 337 normally projecting downwardly into a groove 338 formed in the top of the folding assembly R in which the projection may travel when the assembly P is adjusted. In the operation of the machine, as has been stated, the folder bar 296 is swung down into horizontal position to fold one margin of the cover over the boards. When this position is reached, the end of the projection 337 is in the path of movement of a push-bar 339 which is then moved forward to swing the tucker about its pivot and cause it to press the end portion of the folded-over margin, as shown in Fig. 13, down upon that portion of the unfolded margin which is beneath it. The push-bar 339 has integral with it near one end a small slide bar 340 which slides in a guide 341 carried by the block 303. Near its other end it has fast to it a similar guide bar 342 running in a guide 343. A tension spring 344 is fast at one end to one end of the push-bar and at the other end to the block 303; and a similar tension spring 344' similarly acts upon the other end of the push-bar. Thus, the push-bar is normally held withdrawn, as shown in Fig. 12. In order to push the bar forward at the proper times, abutments 345, 346 carried by the folder actuating bar 301 engage the small slide bars 340, 342 and push them, and with them the bar 339, forward into the position shown in Figs. 11 and 13, during which movement the push-bar engages the projection 337 on the tucker 334 and swings the tucker in a horizontal path about its pivot 335 to cause the tucker to wipe over the extreme end of the folded margin to produce the result shown in Fig. 13. At the same time the tucker at the other end of the folder bar 296 is of course similarly operated as are the two tuckers associated with the folding assembly Q. There are, of course, no tuckers on the folding assemblies R and S which are located at the lower level.

It should be noted that the tucker 334 comprises a thin extension 347, which extends over the margin of the cover when the tucker has been swung down into the position shown in Figs. 10, 12 and 13, and a thicker base having a shoulder 348 which "tucks" the corner in the manner shown in Fig. 13 by pressing the end of the folded margin down upon the unfolded margin and at the same time pushing the end of the folded margin a short distance in a horizontal direction to cause its edge 700 to be bent in slightly so that smooth corners such as are shown in Fig. 14 will be produced.

*The magazines for the boards*

Referring to Figs. 1 and 18, the magazines for the two stacks of boards are supported upon a horizontal slide 351 which is adjustable in a guideway formed in the frame of the machine. Integral with this slide and projecting outwardly from it, as best shown in Fig. 18, is a tubular portion having vertical bearings, one of which is shown at 352, for two vertical slide rods, one of which is shown at 353. Inasmuch as these slide rods are substantially alike only one of them will be described in detail. The rod 353 has fast to its top a base 353' upon which one stack of boards 200 rests. This rod has at one side a hardened plate 354 between which and an inclined plate 355 a locking roll 356 is located, said roll being held at the outer ends of the arms of a fork 357 pivoted at 358 to the supporting slide 351 and having its tail held down by a spring 359 so that the roll 356 is normally in position to hold the rod 353 from upward movement. The rod 353 has a bore in its lower end to receive a small rod 360 adjustably held by a set screw 361; and the rod 360 has a cross piece to which are attached the lower ends of tension springs 362, the upper ends of which are attached to the supporting slide 351. Thus the springs tend always to pull the rod 353 up as far as the locking roll 356 will permit. The rod is adjusted into proper vertical position when a stack of boards 200 is placed on the base 353' of the magazine so that the top of the stack is at substantially the lowest level to which the picker-head will descend; and the purpose of the locking roll and the mechanism for operating it, presently to be described, is to maintain the top of the stack substantially at this level as the height of the stack diminishes. To this end mechanism is provided for intermittently moving the roll 356 to inoperative position just as the picker-head comes down upon the top of the stack. This mechanism comprises a lever 363 pivoted at its middle to the supporting slide 351. The outer end of this lever is beneath the tail of the fork 357 which carries the roll 356, and the inner end is in the path of movement of a vertical push-rod 364 (Fig. 9) carried by a collar 365 (Fig. 18) which is fast to the picker-head shaft 195. The parts are so arranged and timed that, just as the picker-head shaft completes the last step of its downward movement, the rod 364 rocks the lever 363 counterclockwise, thereby lifting the tail of the fork 357 and moving the locking roll 356 down into inoperative position. The springs 362 are now free to push up the stack of boards, if necessary, so that the suckers on the lower face of the picker-head will always engage a board. The other stack of boards 100 lies directly in front of the stack of boards 200, as viewed in Fig. 18, and is supported in the same manner. The other supporting rod, which corresponds to the supporting rod 353 is shown in Fig. 9 at 367, together with its locking and releasing mechanism. This rod also appears in Fig. 7, together with one of its supporting springs 369.

Turning now to Fig. 19, the magazine which holds the stack of boards 100 comprises, in addition to the bottom supporting plate, two side walls 370, 371, in the form of vertical plates, and two end bars 372, 373. This magazine is substantially the same as the other magazine for the stack of boards 200 and, since this other magazine is more clearly shown, it will be described in detail. This magazine comprises side walls 374, 375, the wall 375 being provided with leaf springs 376 and a stationary abutment 377 adapted to engage the top of the stack. The wall 374 is provided with two abutments, the one at 378 being stationary, and the one at 379 being pivoted at 380. Besides the two side walls, the magazine has end bars 381, 382, the bar 381 being provided with a yielding finger 383. A similar yielding finger 384 is carried by the end bar 373 of the other magazine, the mounting of said yielding finger being shown in Fig. 22. This finger is pivoted at 385 to a lug on the end bar 373 and is urged at all times by a compression spring to rotate as far as a stop screw 386 will permit. Returning now to the other magazine, the purpose of the leaf springs 376, 377 and the yielding finger 383 is to keep the boards of the stack in alinement. The purpose of the abutments 377, 379, which overhang slightly the edges of the topmost board, is to cause this board to be buckled somewhat when it is picked up by the picker-head, such buckling facilitating the separation of one board at a time from the stack.

The entire magazine structure is supported on a casting 387 which is part of the main supporting slide 351 (Fig. 1) by which, as has been described above, the bases or plates upon which the stacks of boards rest is carried. The wall 374 is rigid with a slide 388 which may be adjusted by turning a screw 389. The end bar 382 of the magazine has rigid with it a block 390 slidable in a horizontal guideway in the wall 374. The wall 375 is supported by a casting 391 slidable horizontally on a guide which is part of the casting 387. The corresponding wall 371 of the other magazine is supported by a casting 392; and a long adjusting screw 392' is provided with right- and left-hand threaded portions which are threaded respectively through the castings 391, 392. The screw is held from longitudinal movement by a stationary member 393, through which it passes loosely, and collars 394 held in place by nuts 395 so that, when the nuts have been loosened, the screw may be turned to adjust these castings, and with them the walls 371 and 375 of the two magazines, toward and from each other widthwise of the boards. As has been explained, the wall 374 may also be adjusted widthwise of the boards by turning the screw 389; and a screw, not shown, like the screw 389 provides means for adjusting the wall 370 widthwise of the boards. The end bar 372 is adjustably mounted on the end wall 370 in the same manner that the end bar 382 is mounted on the wall 374. As will presently be explained, the other two end bars 373 and 381 of the two magazines are also adjustable lengthwise of the boards so that the magazines may be adjusted to take care of boards of different sizes.

Located between the end bars 373, 381 is a mechanism presently to be described, comprising suckers and separator blades which act to lift up one end of each of the top boards just as the picker-head descends, in order to insure that only one board shall be picked up from each stack by the picker-head. When the boards have been largely or wholly removed from the stacks, and it is necessary to refill the magazines, it is, of course, desirable to provide ready access to the magazines. To this end, the two end bars 373, 381, together with the entire board separating mechanism located between them, may be swung down about the common axis of a pivot 396 and another one like it at the other end of the mechanism so as to open the magazines at their ends whereupon new stacks of boards may readily be placed in the magazines. The pivot 396 is carried loosely by a depending arm 397 having at its upper end a block 398 which is slidable in a horizontal guideway in the wall 374; and a right- and left-hand threaded screw 399, held from longitudinal movement as shown, is threaded through this block and through the block 390 which carries the other end bar 382. The hub at the lower end of the bar 381 is fast to the pivot 396 as is also the hub at the lower end of a locking bar 401, the upper end of which has a spring-pressed locking pin 403 which normally locks this arm to the block 398. Consequently, when the locking pin is in locking position, as shown, rotation of the adjusting screw 399 will adjust the end bar 381 lengthwise of the stack of boards; but, when the locking pin has been pulled out, the locking arm 401 and with it the end bar 381 may be swung down about the pivot 396 into horizontal position. At the other end of the magazine from that shown in Fig. 19, the end bar 373 is similarly mounted. This other end bar is shown in Fig. 7, the locking pin for this bar being shown at 405.

The whole mechanism for separating the two upper boards from the stacks, which is located between the end bars 373, 381, is supported upon the horizontal tops of an angle iron 406 and another one like it, the depending arms of which are fastened respectively to the end bar 381 and the end bar 373. It will now be clear that, by withdrawing the locking pins 403, 405, the arm 401 and the corresponding arm 407 (Fig. 7) may be swung down so as to swing down into substantially horizontal position the two end bars 373, 381 of the magazines and with them the whole mechanism which is located between them, so as to permit new stacks of boards to be placed in the empty magazines. After the magazines have been filled, the parts are swung up again and locked by the pins 403, 405 in the position shown.

The mechanism for separating the topmost boards of the stacks from said stacks comprises two units each having a pair of suckers and a separator blade; and since these two sets of suckers and separator blades are alike only one set of suckers and one separator blade will be described in detail. Referring to Fig. 19, the separator blade 408 is slidably mounted in a suitable guideway in the top of a plate 409 which is supported on a flat bar 410 held by the upstanding arms of a U-shaped member 411, said upright U-shaped member being carried by a horizontal U-shaped member 412 which in turn is carried by the angle iron similar to the angle iron 406 which has been described above. The separator blade 408 is reciprocated by means of a pin 413 projecting downwardly from its under side which extends through an elongated slot in the bent up end of an arm 414, the lower end of which is fast to a rock-shaft 415. This rock-shaft has also fast to it the lower end of a small arm 416 the upper end of which rests upon a cross bar 417 fast to an upright slide rod 418. This slide rod has at its bottom another cross bar 419 to which is fastened the lower ends of tension springs 420. The upper ends of these springs are hooked over the ends of the rock-shaft 415 and thus hold the slide rod 418 normally in raised position as shown, a stop, not shown, being provided to limit the extent of upward movement of the slide rod. Fast to the top of this rod is a generally U-shaped member 421 adapted to receive an end of the picker-head arm 193, shown in Fig. 7, when a picker-head is above the stacks of boards. The U-shaped member 421 has fast to it a depending actuator 422, the lower end of which is directly above the free end of the small arm 416. When, therefore, a picker-head descends to pick up boards, the actuator 422 swings the small arm 416 down, rocks the small shaft 415, and thereby, through the arm 414 and the pin 413, pushes the separator blade 408 beneath the uppermost board of the stack of boards 100; and when the picker-head rises, the movements which have just been described are reversed by the action of the springs 420. The separator blade for the other stack is indicated at 423 and its actuating arm at 424. A second small arm 425, the lower end of which is fast to the rock-shaft 415, rests with its upper end on the cross bar 417 and acts with the other small arm 416 in withdrawing the separator blades.

In order to insure that each separator blade shall enter directly beneath the uppermost board of each stack, a pair of lifters in the form of suckers is provided to cooperate with each blade. These suckers normally rest upon the uppermost board and are swung up by the advancing separator blades so as to lift up one end of the uppermost board just before the separator blade is thrust beneath it. Inasmuch as the two suckers which cooperate with the separator blade 408 are not shown in Fig. 19 and are the same as the suckers which cooperate with the separator blade 423 which are shown in Fig. 20, the construction and mounting of the latter suckers will be described in detail. The two suckers 426 are mounted at the outer ends of metal tubes 427, the inner ends of which are clamped to the outer ends of two small rods 428 by two pairs of cross bars drawn together by a screw 429. The inner ends of these rods are fastened by set screws 430 in bores in a rocking block 431 having trunnions at its ends mounted in upstanding arms of small angle irons 432, 433, the horizontal arms of which are fastened to the plate in a groove in the upper face of which the separator blade 431 a long slender bar 433 is clamped to the under sides of the small rods 428 by means of a small 423 is slidable. Just in front of the rocking bar cross bar 434 and a screw 435. If now the long slender bar 433 should be pulled up, the suckers would be swung up about the axis of the trunnions of the block 431. Suction is applied to them and they are so swung up just before the separator blade 423 is thrust beneath the topmost board of the stack. The control of the suction will be described later. The swinging up of the suckers 426 is caused by the swinging up of the other pair of suckers shown in Fig. 2 at 436. Referring again to Fig. 19, in which the mounting of this other pair of suckers is shown, the suckers are clamped to two small rods 437 which are like the small rods 428 of the first-described suckers and the ends of which are fastened in bores in a rocking block 438. To the under side of the two small rods 437 is clamped a small bar 439 the outer end of which extends beneath the adjacent outer end of the bar 433, so that when the small rods 437, which support the suckers of the stack of boards 100, are swung up, the suckers for the stack of boards 200 are also swung up. The two small rods 437 are swung up by two cams 440, 441 having inclined upper faces which are swung horizontally beneath the rods 437 when the separator blade 408 moves forward. These two cams are fast respectively to small plates 442, 443 pivoted to the plate 409 by small screws, as shown, and are normally held in such angular positions that the inclined cams 440, 441, near the rear ends of these plates are held spaced from each other and withdrawn from beneath the small rods 437 so that the suckers rest upon the top of the stack. When the separator blade 408 starts forward, suction is applied to the suckers in a manner presently to be described, and thereafter the blade pushes the forward ends of the two pivoted plates 442, 443 apart to cause the inclined cams 441 to be forced beneath the rods 437 so as to raise the suckers and thereby cause them to lift the rear end of the topmost board of the stack. Similarly, suction is also applied to the other two suckers 426 and they are also swung up. Referring to Fig. 2, the swinging plate 442 is normally held in inoperative position by a leaf spring 444, and the swinging plate 443 by a tension spring 445. As best shown in Fig. 2 the sucker and separator blade unit associated with the stack of boards 200 has one swinging cam-carrying plate 446 normally held in inoperative position by a leaf spring 447 which cooperates with the other mechanism described above in swinging up the suckers 426.

As has been described above, the suckers are swung up by the advancing separator blades. In order, however, to supplement this action an auxiliary means is provided which acts upon the swinging plate 443 (Fig. 19). This auxiliary means is an inclined cam face on one side of the lower portion of the flat bar 422 which depends from the U-shaped member 421. When the picker-head engages the U-shaped member 421 and pushes it down, the inclined cam face on the side of the depending flat bar 422 swings the pivoted plate 443 so that the inclined cam 441 on it is pushed beneath one of the rods 437 and thereby raises the suckers.

Returning now to Figs. 19, 20 and 21, the mechanism for applying suction to and withdrawing it from the suckers will be described. Flexible tubes 448 lead from the ends of the metal tubes 427 of the suckers 426 to nipples which enter ports 449 in a suction box 450 with ports in the bottom of which communicate flexible tubes 451 connected to the same suction device which applies suction to the picker-head. This suction box has a cylindrical bore to receive a hollow cylindrical valve 452 which has ports 453 and other ports, not shown, at substantially right angles thereto. When, therefore, this valve is rocked, suction is alternately applied to and cut off from the suckers 426. This same valve also controls in the same manner the suction with respect to the other pair of suckers which are connected to the suction box 450 by flexible tubes 454. The farther end of the valve 452 is solid and has a flat face to which is screwed the lower end of a small arm 455, the upper bent end of which has a slot to receive a pin 456 depending from the underside of the seperator blade 408. Consequently when this blade moves forward, in the manner which has been described above, it rocks the valve 452 to cause suction to be applied to both pairs of suckers; and when this separator blade is withdrawn, it cuts off the suction. Briefly then, when the picker-head moves down toward the stacks of boards, it pushes down the rod 418 whereupon the two pairs of suckers lift up the ends of the two uppermost boards and the two separator blades are thrust respectively beneath said boards. Just as the picker-head reaches the limit of its downward movement its suckers take hold of the board and, as it rises with the boards, suction is cut off from the two pairs of suckers associated with the separator blades, and the two separator blades are withdrawn. The picker-head thus lifts two boards from the stacks, and thereafter transfers them to the folding station in the manner which has been described.

*The mechanism for providing a backing strip*

A backing strip is taken from the magazine with each pair of boards and transferred to the glue-coated cover at the folding station. The backing strip is cut off from the end of a long strip of suitable width and placed between the stacks of boards. Referring to Fig. 19, the backing strip, when in place ready to be picked up by the picker-head, rests with its opposite margins upon two shoulders 457, 458 formed respectively on the walls 371, 375 of the two magazines. Referring to Fig. 18, the free end of a large coil 700 of backing strip material is lead up first between guide rolls 459 and then between feed rolls 460, 461 which feed a suitable length of it to the supporting shoulders 457, 458 (Fig. 19) on the walls of the magazines, said length being cut off by a knife 462 to form a backing strip. Referring now to Figs. 16 and 17, the upper roll comprises two sections adjustable on a shaft 463, each section being provided with a disk cutter 464 between which the lower roll 461 is received, so that the strip 700 will be trimmed to proper width if necessary; and by adjusting the sections to different positions backing strips of different widths may be produced. The shaft of the upper roll is rotatable in a bearing 465 having an upright rectangular stem 466 slidably received in a suitable stationary guideway and urged downward at all times by a compression spring (shown at 466' in Fig. 19) the upper end of which bears against the under side of a flange 467 on a cover plate 468. Fast to the shaft of the upper roll is a small gear 469 which meshes with a gear 470 fast to the shaft 471 of the lower roll 461. The gear 470 is connected by a one-way clutch, not shown, to a gear 473 which is loose on the shaft 471 and in turn meshes with a large gear 474 fast to a short rotatable shaft. Also fast to this short shaft is a gear 475 which meshes with a segmental rack 476. The one-way clutch between the gears 470, 473 is so constructed that when the segmental rack 476 is swung down, the clutch is operated and the end of the strip 700 is fed forward between rolls 460, 461, but when the segmental rack is swung up, no motion is imparted to the feed rolls. The knife 462, which severs the strip, cooperates with a shear edge 477 and is fast to a lever 478 pivoted at 479 to the frame and normally held up by a spring 480, the lower end of which extends beneath the holder and the upper end of which is hooked over a stationary part, the middle portion of the spring being coiled around a stud in the usual manner. The knife is normally held up in a position determined by a stop screw 481; it is swung down at the proper time to sever the strip by a descending picker-head having an abutment screw 483' (shown in Fig. 6) which strikes the top of an actuator 482 pivoted at 483 to the frame of the machine. Referring to Fig. 8, the stem of the segmental rack 476 is in the form of a bent lever pivoted intermediate its ends at 484. The end of the stem remote from the segmental rack is connected by a link 485 to a generally upright lever 486 having a roll 487 which runs on a cam 488 on the cam shaft 125; and, in order to permit this rod to be lifted somewhat from the cam so as to vary the throw of the segmental rack 476, a small rod 489 provided with a hand wheel 490 is threaded through a lug on the frame and bears with its end upon the tail of the lever 486 so as to swing it about its pivot 486'. By turning this rod to move the small roll 487 more or less away from the axis of the cam 488, the length of the backing strip which is cut off may be varied. Referring to Fig. 16, a chute 491 in the form of a tube is provided to receive waste material cut off from the sides of the strip by the trimming cutters 464.

*The picker-head construction and mode of operation*

As has been explained, the picker-heads act in succession to remove two boards and a backing strip from the magazines, transfer them to the folding station and cooperate with the folding mechanism at that station; and, inasmuch as these two picker-heads are substantially alike, only one of them will be described. Referring to Fig. 6, one end of the heavy arm 193 which carries both picker-heads is provided with a horizontal guide rib 492 to receive a carrier block 493 adjustably held in position by a set screw 494. This block has a horizontal extension 495 provided with a dovetail guide rib on which is slidably mounted for adjustment a bracket 496. A similar bracket 497 is similarly adjustably mounted on the other end of the horizontal extension 495 on the farther side of the arm 193; and these two brackets carry rotatably mounted in bearings at their upper ends a small rock-shaft 498. Adjustably fastened at their upper ends to this shaft are two sets of holddowns, a middle pair 499, 501, and an end pair 503, 505, all of which are normally held swung out somewhat so that the outer sides of their lower board-engaging ends are substantially in line with the edges of the two boards beneath them. In the figure, they have been swung inwardly by the folder bar 296 which has been swung down into horizontal position, to fold opposite margins of the cover over ends of the boards. The particular mechanism shown is designed to handle boards which are very thin and flexible, and the principal purposes of these holddowns is to prevent the margins of these thin boards from being bent or crumpled during the folding operation. These holddowns are held out in their normal position to engage the boards close to the edges thereof, when the picker-head descends to place the boards and the backing strip on the glue-coated cover, and drag over the upper surfaces of the margins of the boards when they are pushed back into the position shown by the folder bar 296. They are normally held swung out by leaf springs, not shown, which are fast respectively to the holddowns 499, 501 and bear with their free ends against lugs on the brackets 496, 497. Stop-screws 501' on the holddowns cooperate with lugs, not shown, on the brackets to limit the extent of outward swinging movement of the holddowns. The small rock-shaft 498 extends along one end of the cover, and a similar rock-shaft with hold-downs extends along the opposite end, as will presently appear. There are no rock-shafts along the two opposite sides of the cover, and in order to provide for holding down the side margins of the boards during the folding operation, the four holddowns at the ends of the two rock-shafts are constructed for yielding swinging movement in two directions so as to cooperate first with the two end folders at the upper level, as shown in Fig. 6, and then with the two side folders at the lower level. Inasmuch as all four of these holddowns are substantially alike, only one will be described. The end holddown 503 comprises an upper portion, adjustably clamped to the rock-shaft 498 by a pinch screw, and a lower portion 503' hinged to the upper portion about a pivot 504, which extends at right angles to the rock-shaft 498. A leaf spring 505 fastened to one side of the upper portion 503 bears with its free end against one side of the pivoted lower portion 503' and holds said lower portion normally against a stop 506 in the position shown. This holddown thus acts like the two middle hold-downs 499, 501 during the folding of an end of the cover and is swung back with them into the position shown. When, now, the picker-head descends to the lower level, where the sides of the cover are folded, the lower portion 503' of the holddown serves to hold down the margin of the side of the board beneath it near the opposite ends of said margin during the folding of the side margin of the cover, and during this folding it is swung about its pivot 504 by the side folder S shown in Fig. 2. A second small rock-shaft 507 (Fig. 6) like the rock-shaft 498 is rotatably mounted in the upper ends of two brackets 508, 509, like the brackets 496, 497, said first-named brackets being slidably mounted upon a horizontal extension, not shown, like the horizontal extension 495 of a block, not shown, like the block 493, which is slidably mounted on a rib 510 like the rib 492. It is thus possible to adjust the two small rock-shafts toward and from each other to provide for covers of different heights, and to adjust the various holddowns along the shafts to provide for covers of different widths. It is also possible to replace the rock-shafts with longer or shorter ones if necessary. The rock-shaft 507 has adjustably fastened to it two middle hold-downs 511, 512 the lower operative portions of which consist of plates 513 which are adjustably held by pinch screws so that they may be adjusted widthwise of the cover; and the lower ends of the holddowns 499, 501 have similar plates.

After the holddowns have been swung inward by the folder bars at the upper level, as shown in Fig. 6, it is desirable that they be held in this position during the time that the picker-head descends to the lower level where the side margins of the cover are folded and until the picker-head has risen clear of the folding mechanism so as to ensure that the holddowns shall not swing out and thus disarrange the folded-over margins when the folders have been swung up, and for this purpose the holddowns are locked in the inward position shown at the end of the folding of the ends of the margins of the covers. This locking is accomplished by two latches 514, 514' which engage respectively the two main portions of the end holddowns 505, 506' (see also Fig. 7). Inasmuch as these latches are alike only one will be described in detail. The inner end of the latch 514 is pivoted at 515 to a stationary member carried by the bracket 497. At its outer end it is provided in its under side with a notch adapted to engage a horizontal pin 516 carried by the main portion of the end holddown 505. A small leaf spring 517 urges the outer end of the latch to swing downwardly about its pivot 515 and holds the under side of the latch pressed at all times against the pin 516. When now the end holddown 505 is swung inward to the position shown in Fig. 6 at the upper level of the folding mechanism, the notch in the latch engages the pin 516 and holds the holddown from swinging out again when the swinging folder bar swings back into its vertical position. The other latch 514' acts similarly on the other end holddown 506'; and since these holddowns are fast respectively to the two small rock-shafts 498, 507, all of the holddowns are held as shown in Fig. 6. It is, of course, necessary that the latches should be swung up to release the end holddowns and to permit all the holddowns to assume their normal outward positions at some time before the picker-head has completed a revolution and returned again to the folding station. The outer ends of these latches are swung up to free their notches from the pins, during the descent of the picker-head upon the stacks of boards. During this descent, the outer ends of the two latches are lifted by contact respectively with two stationary inclined cams 518, 519 (Fig. 19).

When this lifting of the outer ends of the latches occurs, the springs swing the holddowns outwardly. It is necessary, however, that they be swung inward and held inward before the picker-head moves down into contact with the boards of the stacks since otherwise they would strike the suckers or other members which overhang the stacks.

To this end, the rock-shafts 498, 507 have fastened to their remote ends, as viewed in Fig. 6, hubs of depending arms 520, 521 carrying at their lower ends rolls which, when the picker-head descends upon the stacks of blanks in the magazines, strike stationary cams and rock the two shafts to swing the holddowns inwardly and hold them in this position. In Fig. 15, the depending arm 520 on the rock-shaft 498 is shown with its roll 522; and the stationary cam which cooperates with this roll is shown at 523. A second stationary cam 524 cooperates with the roll at the lower end of the depending arm 521 (Fig. 6) of the other rock-shaft. These two stationary cams are shown on a large scale in Fig. 19. Thus, when a picker-head moves down toward the stack of boards, the holddowns are unlatched, swung inwardly and held in that position until the picker-head has picked up two boards and a backing strip and has risen until it bottom is some distance above the stack, whereupon the small rolls at the lower ends of the depending arms 520, 521 rise above the stationary cams 523, 524, and the holddowns are one pair of opposite edges of the boards, said holddowns being movable away from said edges over the boards during the folding of two margins of the cover about said edges, the four holddowns adjacent to the corners of the board and adjacent to the other pair of opposite edges of the boards being also movable away from said last-named edges over the boards during the folding of the other two margins of the cover.

40. A machine for making book cases having, in combination, folding mechanism, a support for an unfolded case, two series of holddowns for engaging the margins of the boards along opposite ends of the case, all of said holddowns being yieldingly movable inwardly of the case in paths which are parallel to one dimension of the case, the four holddowns adjacent to the four corners of the boards being also yieldingly movable inwardly of the case in paths which are parallel to the other dimension of the case.

41. A machine for making book cases having, in combination, folding mechanism including a support for a case, and two series of holddowns, one series engaging the boards of the case along one end of the case and the other series engaging the boards along the opposite end, said holddowns being movable inwardly of the case in paths extending heightwise of the case during the folding of the end margins of the cover, the four holddowns adjacent to the corners of the case being also movable inwardly of the case widthwise of the case during the folding of the side margins of the cover.

42. A machine for making book cases having, in combination, a support, means for placing a cover upon the support, means for placing boards upon the cover and for moving the support to and causing it to remain for an interval at each of two different levels, a pair of folders located at each of the two levels and angularly movable about axes substantially parallel to adjacent edges of the boards, to fold the margins of the cover about edges of the boards, and two series of holddowns, all of the members of which cooperate with the pair of folders at one level, and the end members of which also cooperate with the other pair of folders at the other level.

43. A machine for making book cases having, in combination, folding mechanism, a picker-head adapted to cooperate with said mechanism, a holddown mounted on the picker-head and movable inwardly over a board during the folding operation, and means for locking said holddown in its inward position.

44. A machine for making book cases having, in combination, folding mechanism, a picker-head adapted to cooperate with said mechanism, a holddown mounted on the picker-head and movable inwardly over a board during the folding operation, means for locking said holddown in its inward position, and means for thereafter unlocking said holddown.

45. A machine for making book cases having, in combination, folding mechanism, a picker-head adapted to deliver a board to the folding mechanism and to cooperate with the folding mechanism in the folding operation, a holddown mounted on the picker-head for movement inwardly of the case during the folding operation, and means for locking the holddown in its inward position.

46. A machine for making book cases having, in combination, folding mechanism, a picker-head adapted to deliver a board to the folding mechanism and to cooperate with the folding mechanism in the folding operation, a holddown mounted on the picker-head for movement inwardly of the case during the folding operation, means for locking the holddown in its inward position, and means for unlocking the holddown to permit it to move to its normal outward position prior to the delivery of another board to the folding mechanism.

47. A machine for making book cases having, in combination, folding mechanism, a picker-head adapted to deliver boards to the folding mechanism and to cooperate with the folding mechanism in the folding operation, two sets of holddowns mounted on the picker-head for movements inwardly of the case during the folding operation, and means for locking the two sets of holddowns in their inward positions.

48. A machine for making book cases having, in combination, folding mechanism, a picker-head adapted to deliver boards to the folding mechanism and to cooperate with the folding mechanism in the folding operation, two sets of holddowns mounted on the picker-head for movements inwardly of the case during the folding operation, means for locking the two sets of holddowns in their inward positions, and means for unlocking the holddowns and for returning them to their normal outward positions prior to the delivery by the picker-head of other boards to the folding mechanism.

49. A machine for making book cases having, in combination, a support for the cover and boards of a case, said support being mounted in a rectangular opening in the frame whereby movement of the support with the unfolded case upon it bends up the margins of the case, a picker-head movable with the support in the opening, a holddown mounted on the picker-head for movement inwardly of a board away from an edge thereof during the folding operation, and means for locking said holddown in its inward position.

50. A machine for making book cases having, in combination, a receptacle for adhesive, a roll partly immersed in the adhesive, means for rotating the roll intermittently while the machine is running to apply adhesive to covers, and means for rotating said roll continuously while the machine is at rest to prevent hardening of the adhesive upon that portion of the roll which is exposed to the atmosphere.

51. A machine for making book cases having, in combination, a receptacle for adhesive, a roll partly immersed in the adhesive, a shaft which is constantly rotating when the machine is running, means for causing the shaft to impart intermittent rotations to the roll, and other means for rotating the roll continuously when the machine is at rest.

52. A machine for making book cases having, in combination, a receptacle for adhesive, a roll partly immersed in the adhesive, a constantly rotating shaft, connections between the shaft and the roll for rotating the roll continuously, mechanism for rotating the roll intermittently, a treadle for starting and stopping the machine, and means operated by manipulation of the treadle to start the machine for disconnecting the roll from the constantly rotating shaft and connecting it to the mechanism for rotating it intermittently to apply adhesive to covers.

53. A machine for making book cases having, in combination, a receptacle for adhesive, a roll partly immersed in the adhesive, a drum adapted to carry a cover, and means for rotating said drum and roll intermittently, said means comprising a driving shaft, a driving connection between said shaft and the drum and roll, and means for rendering said driving connection ineffective intermittently.

54. A machine for making book cases having, in combination, a receptacle for adhesive, a roll partly immersed in the adhesive, a drum adapted to carry a cover, a rack for rotating said drum and roll, a moving link normally connected to said rack to oscillate it, and means for disconnecting the link from the rack intermittently.

55. A machine for making book cases having, in combination, a support for a stack of boards from the top of which the boards are removed one by one, a lifter, a separator blade, and means for causing the lifter to lift one edge of the topmost board and the blade to be thrust beneath said board.

56. A machine for making book cases having, in combination, a support for a stack of boards from the top of which the boards are removed one by one, a suction lifter, a separator blade, and means for applying suction to the lifter, for causing it to lift an edge of the board and for thrusting the separator blade beneath the board.

57. A machine for making book cases having, in combination, folding mechanism, a support for a stack of boards, a picker-head adapted to descend upon the top of the stack to remove a board therefrom and transfer it to the folding mechanism, a lifter, a separator blade, and means for causing the lifter to lift an edge of the topmost board and the blade to be thrust beneath it to facilitate removal from the stack by the picker-head of a single board.

58. A machine for making book cases having, in combination, folding mechanism, a support for a stack of boards, a picker-head adapted to descend upon the top of the stack to remove a board therefrom and transfer it to the folding mechanism, a suction lifter, a separator blade, and means for applying suction to the lifter, for causing the lifter to lift an edge of the board and for thrusting the separator blade beneath the board before the picker-head descends upon the board, to facilitate removal from the stack by the picker-head of a single board.

59. A machine for making book cases having, in combination, a support for a stack of boards from the top of which the boards are to be removed one by one, a suction lifter, a valve for controlling the application of suction thereto, a separator blade movable beneath the topmost board, and means operated by movement of the separator blade to operate the valve.

60. A machine for making book cases having, in combination, a support for a stack of boards from the top of which the boards are to be removed one by one, a suction lifter, a valve for controlling the application of suction thereto, a separator blade movable beneath the topmost board, and means operated by movement of the separator blade to operate the valve and to raise the lifter.

61. A machine for making book cases having, in combination, a support for a stack of boards from the top of which the boards are removed one by one, a lifter, a separator blade, means for moving the separator blade to thrust it beneath the topmost board, and means operated by the moving blade for causing the lifter to lift an edge of the board before the blade is thrust beneath the board.

62. A machine for making book cases having, in combination, a support for a stack of boards from the top of which the boards are removed one by one, a suction lifter, a separator blade, means for moving the separator blade to thrust it beneath the topmost board, and means operated by the moving blade for applying suction to the lifter and for causing the lifter to lift an edge of the board before the blade is thrust beneath the board.

63. A machine for making book cases having, in combination, a support for a stack of boards, a picker-head adapted to descend and remove a board from the stack, a lifter for raising one end of the topmost board of the stack, and means operated by the descending picker-head for operating the lifter.

64. A machine for making book cases having, in combination, a support for a stack of boards, a picker-head adapted to descend and remove a board from the top of the stack, a separator blade, and means operated by the descending picker-head for thrusting the blade beneath the topmost board.

65. A machine for making book cases having, in combination, a support for a stack of boards, a picker-head adapted to descend and remove a board from the top of the stack, a separator blade, means operated by the descending picker-head for thrusting the blade beneath the topmost board, a lifter, and means actuated by the separator blade for operating the lifter.

66. A machine for making book cases having, in combination, a magazine for a stack of boards, and mechanism for lifting part of the topmost board from the remainder of the stack prior to transferring the board to the cover of a case, said mechanism and one wall of the stack being mounted for movement away from the rest of the magazine to facilitate filling the magazine with a new stack of boards.

67. A machine for making book cases having, in combination, a magazine for a stack of boards, and mechanism for lifting part of the topmost board from the remainder of the stack prior to transferring the board to the cover of a case, said mechanism and one wall of the stack being pivoted for swinging movement away from the rest of the magazine to facilitate filling the magazine with a new stack of boards.

68. A machine for making book cases having, in combination, means for folding a margin of the cover over an edge of the boards whereby an end of the folded-over margin projects beyond a board at a locality adjacent to a corner of the board and is opposite to a portion of an unfolded margin at that locality, a pivoted tucker, and means for swinging the tucker in a path substantially parallel to the plane of the case for pressing the end portion of the folded-over margin against the portion of the unfolded margin which is opposite to it.

69. A machine for making book cases having, in combination, a folder movable to fold a margin of a cover about an edge of a board and to lay the margin upon the board, and a tucker pivoted to the folder about an axis which is substantially transverse to the plane of the board when the folder has completed its folding movement.

70. A machine for making book cases having, in combination, a pivoted folder movable to fold a margin of a cover about an edge of a board and to lay the margin upon the board, and a tucker pivoted to the folder about an axis substantially perpendicular to the pivotal axis of the folder.

71. A machine for making book cases having, station in time to receive boards from the picker-heads.

11. A machine for making book cases having, in combination, folding mechanism, means for delivering an adhesively coated cover to the folding mechanism, a plurality of picker-heads for picking up boards from a locality remote from the folding mechanism, placing them upon the cover and cooperating with the folding mechanism, and means for causing the picker-heads alternately to pick up boards and transfer them to the folding station.

12. A machine for making book cases having, in combination, folding mechanism, means for delivering an adhesively coated cover to the folding mechanism, a plurality of picker-heads for picking up boards from a locality remote from the folding mechanism, placing them upon the cover and cooperating with the folding mechanism, and means for causing one picker-head to pick up boards while another picker-head is at the folding station.

13. A machine for making book cases having, in combination, folding mechanism comprising two sets of folding members, one set being located at a level above that of the other set, a plurality of picker-heads, means for causing one picker-head to cooperate first with one set and then with the other set of folding members, and means for causing another picker-head to pick up a board from a locality remote from the folding station while the first-named picker-head is at the folding station.

14. A machine for making book cases having, in combination, a folding station comprising two sets of folding members, one set being located at a level above that of the other set, means for delivering a cover to the folding station, a plurality of picker-heads, means for causing one picker-head to cooperate first with one set and then with the other set of folding members, and means for causing another picker-head to pick up a board from a locality remote from the folding station while the first-named picker-head is at said station and thereafter carrying the board to the folding station.

15. A machine for making book cases having, in combination, folding mechanism, a board-supply station, a plurality of picker-heads, means for moving the picker-heads simultaneously into positions in which one is above the board-supply station and the other above the folding station, means for moving the picker-heads down, means for causing the folding mechanism to operate, means for thereafter moving the picker-heads up, and means for moving that picker-head which was at the board-supply station to the folding station.

16. A machine for making book cases having, in combination, folding mechanism, a board-supply station, a plurality of picker-heads, means for moving the picker-heads simultaneously into positions in which one is above the board-supply station and the other above the folding station, means for moving the picker-heads down, means for causing the folding mechanism to operate, means for thereafter moving the picker-heads up, and means for moving that picker-head which was at the board-supply station to the folding station and for moving the other picker-head to the board-supply station.

17. A machine for making book cases having, in combination, folding mechanism, a board-supply station, a plurality of picker-heads, means for moving the picker-heads simultaneously into positions in which one is above the board-supply station and the other is above the folding station, means for moving the picker-heads down, means for causing the folding mechanism to operate, means for thereafter moving the picker-heads up, means for causing the picker-heads to change places, and means for delivering covers one at a time to the folding station to receive boards successively from the picker-heads.

18. A machine for making book cases having, in combination, a plurality of picker-heads revoluble in a closed circular path, a folding station and a board-supply station located respectively at different points adjacent to said path, and means for revolving the picker-heads intermittently through parts of said path.

19. A machine for making book cases having, in combination, a plurality of picker-heads revoluble in a common circular path, a folding station and a board-supply station located respectively at different points adjacent to said path, means for revolving the picker-heads intermittently through parts of said path, and means for delivering a cover to the folding station at each intermittent part-revolution.

20. A machine for making book cases having, in combination, a plurality of picker-heads revoluble in a closed circular path, a folding station and a board-supply station located respectively at diametrically opposite points adjacent to said path, and means for imparting to said picker-heads intermittent half-revolutions.

21. A machine for making book cases having, in combination, a plurality of picker-heads revoluble in a common circular path, a folding station and a board-supply station located respectively at diametrically opposite points adjacent to said path, means for imparting to said picker-heads intermittent half-revolutions, and means for delivering a cover to the folding station at each half-revolution of the picker-heads.

22. A machine for making book cases having, in combination, a folding station, a board-supply station, a plurality of picker-heads revoluble in a closed circular path, and means for intermittently imparting to said picker-heads straight-line movement away from said stations and movement of revolution in a path transverse to said straight-line movement to cause the picker-heads to be located in succession first adjacent to one station and then adjacent to the other.

23. A machine for making book cases having, in combination, a folding station, a board supply station, a plurality of picker-heads revoluble in a closed circular path, means for intermittently imparting to said picker-heads straight-line movement away from said stations and movement of revolution in a path transverse to said straight-line movement to cause the picker-heads to be located in succession first adjacent to one station and then adjacent to the other, and means for delivering covers in succession to the folding station.

24. A machine for making book cases having, in combination, folding mechanism comprising two sets of folding members one set being located at a level above that of the other set, a board-supply station, a plurality of revoluble and vertically movable picker-heads, and means for first revolving the picker-heads to bring one picker-head into position above the folding mechanism and another above the board-supply station, then lowering the picker-heads to cause one picker-head to cooperate first with one set of holders and then with another and finally raising the picker-heads and imparting to them a partial revolution.

25. A machine for making book cases having, in combination, a folding station, a board-supply station, a shaft, a cross-arm at the upper end of the shaft, two picker-heads carried one at each end of the arm in such positions that one picker-head may be located at the folding station while the other is located at the board-supply station, and means for intermittently lowering and raising said shaft and for imparting half-revolutions thereto.

26. A machine for making book cases having, in combination, a folding station, a board-supply station, a shaft, a cross-arm at the upper end of the shaft, two picker-heads carried one at each end of the arm in such positions that one picker-head may be located at the folding station while the other is located at the board-supply station, means for intermittently lowering and raising said shaft and for imparting half-revolutions thereto, and means for delivering covers to the folding station one for each half-revolution of the shaft.

27. A machine for making book cases having, in combination, a folding station, a board-supply station, a plurality of picker-heads, a shaft upon which said heads are mounted, means for raising and lowering said shaft, an oscillating rack, and a gear fast to the shaft and located so as to be in mesh with the rack only when the shaft occupies its highest position.

28. A machine for making book cases having, in combination, a folding station, a board-supply station, a plurality of picker-heads, a shaft upon which said heads are mounted, means for raising and lowering said shaft, a gear fast to the shaft so as to move up and down with the shaft, and an oscillating rack adapted to engage the gear when the shaft is in its uppermost position, the oscillation of the rack being so timed that the gear is given partial rotations, always in the same direction.

29. A machine for making book cases having, in combination, a folding station, a board-supply station, two picker-heads each adapted to pick up boards at the board-supply station, to carry the boards to the folding station, means for locating one picker-head at the folding station and the other picker-head at the board-supply station, and means for applying suction to and for cutting it off from the picker-heads alternately while they are respectively at the two stations.

30. A machine for making book cases having, in combination, a folding station, a board-supply station, two picker-heads each adapted to pick up boards at the board supply station to carry the boards to the folding station, means for locating one picker-head at the folding station and the other picker-head at the board-station, means for applying suction to and for cutting it off from the picker-heads alternately while they are respectively at the two stations, and means for delivering covers one by one to the folding station to be acted upon in succession by the picker-heads.

31. A machine for making book cases having, in combination, a folding station, a board-supply station, two picker-heads each adapted to pick up boards at the board-supply station to carry the boards to the folding station, means for locating one picker-head at the folding station and the other picker-head at the board-supply station, means for applying suction to and for cutting it off from the picker-heads alternately while they are respectively at the two stations, means for delivering covers one by one to the folding station to be acted upon in succession by the picker-heads, and means for removing the folded cases from the folding mechanism and subjecting them to pressure.

32. A machine for making book cases having, in combination, a folding station, a board-supply station, a plurality of picker-heads, means for moving the picker-heads to locate one picker-head at the folding station and another picker-head at the board-supply station, and means for cutting off suction from the first-named picker-head and for applying suction to the other picker-head.

33. A machine for making book cases having, in combination, a folding station, means for delivering a cover to the folding station, a board-supply station, a plurality of picker-heads, means for moving the picker-heads to locate one picker-head at the folding station and another picker-head at the board-supply station, and means for cutting off suction from the first-named picker-head and for applying suction to the other picker-head.

34. A machine for making book cases having, in combination, folding mechanism, a plurality of picker-heads, mechanism for applying suction to and for cutting it off from said picker-heads, means for applying suction to one picker-head and for causing that picker-head to cooperate with the folding mechanism while another picker-head is adjacent to a supply of boards, and means for cutting off the suction from the first-named picker-head and for applying suction to the other picker-head.

35. A machine for making book cases having, in combination, a plurality of picker-heads revoluble about a common circular path, a folding station and a board-supply station located respectively at different points beneath said path, means for revolving the picker-heads intermittently through parts of said path, and means for applying suction to and for cutting it off from the picker-heads alternately.

36. A machine for making book cases having, in combination, folding mechanism, a picker-head adapted to cooperate with said mechanism, and a holddown mounted on the picker-head for movement in two directions at an angle to each other during the folding operation.

37. A machine for making book cases having, in combination, folding mechanism, a picker-head adapted to cooperate with said mechanism, and a holddown carried by the picker-head, said holddown comprising two parts, an upper part pivoted upon the picker-head for swinging movement in a predetermined path, and a lower part pivoted to the upper part for swinging movement in a different path.

38. A machine for making book cases having, in combination, folding mechanism, a picker-head adapted to cooperate with said mechanism, and a holddown carried by the picker-head said holddown comprising a part mounted on the picker-head for movement in one direction and another part mounted on the first-named part for movement in another direction.

39. A machine for making book cases having, in combination, folding mechanism including a support on which the parts of the case are held during the folding operation, and two series of holddowns adapted to cooperate respectively with in combination, a support for the boards and the cover of a case, a pivoted folder, and a tucker pivoted to the folder.

72. A machine for making book cases having, in combination, a support for the boards and the cover of a case, a pivoted folder, means for swinging the folder about its pivot to fold a margin of the cover, a pivoted tucker, and means for thereafter swinging the tucker about its pivotal connection with the folder to tuck a corner.

73. A machine for making book cases having, in combination, a folding station, a board supply station, a picker-head, means for moving the picker-head successively into register with the stations, and friction means for preventing overthrow of the picker-head.

74. In a machine for making book cases, a folding assembly comprising a supporting bar, a folder and actuating mechanism for the folder, ways on which the supporting bar is adjustable, half-round threaded grooves respectively in the ways and in the supporting bar to form threaded holes, and adjusting screws threaded through the holes whereby the folding assembly may be removed as a unit from the machine.

PERLEY R. GLASS.

CERTIFICATE OF CORRECTION.

Patent No. 1,950,550.  March 13, 1934.

PERLEY R. GLASS.

It is hereby certified that error appears in the printed specification of the above numbered patent requiring correction as follows: Page 5, line 125, after "arm" insert 227; page 7, line 57, after "enter" insert the words conical recesses in small blocks 294 which are; and line 59, strike out the words "fast to the opposite ends of a swing folder car-"; page 10, line 73, strike out the number and words "423 is slidable. Just in front of the rocking bar" and insert the same after "blade" in line 70; and that the said Letters Patent should be read with these corrections therein that the same may conform to the record of the case in the Patent Office.

Signed and sealed this 19th day of June, A. D. 1934.

Bryan M. Battey (Seal)  Acting Commissioner of Patents.

CERTIFICATE OF CORRECTION.

Patent No. 1,950,550. March 13, 1934.

PERLEY R. GLASS.

It is hereby certified that error appears in the printed specification of the above numbered patent requiring correction as follows: Page 5, line 125, after "arm" insert 227; page 7, line 57, after "enter" insert the words conical recesses in small blocks 294 which are; and line 59, strike out the words "fast to the opposite ends of a swing folder car-"; page 10, line 73, strike out the number and words "423 is slidable. Just in front of the rocking bar" and insert the same after "blade" in line 70; and that the said Letters Patent should be read with these corrections therein that the same may conform to the record of the case in the Patent Office.

Signed and sealed this 19th day of June, A. D. 1934.

Bryan M. Battey (Seal) Acting Commissioner of Patents.